(12) United States Patent
Jeong et al.

(10) Patent No.: US 11,662,870 B2
(45) Date of Patent: May 30, 2023

(54) DISPLAY DEVICE INCLUDING TOUCH PANEL AND TOUCH PRINTED CIRCUIT BOARD

(71) Applicant: Samsung Display Co., LTD., Yongin-si (KR)

(72) Inventors: Sang Won Jeong, Daejeon (KR); Tae Young Koo, Yongin-si (KR); Min Chul Song, Suwon-si (KR); In Young Yoon, Cheonan-si (KR)

(73) Assignee: SAMSUNG DISPLAY CO., LTD., Gyeonggi-do (KR)

( * ) Notice: Subject to any disclaimer, the term of this patent is extended or adjusted under 35 U.S.C. 154(b) by 47 days.

(21) Appl. No.: 16/825,545

(22) Filed: Mar. 20, 2020

(65) Prior Publication Data

US 2020/0356217 A1 Nov. 12, 2020

(30) Foreign Application Priority Data

May 7, 2019 (KR) .................. 10-2019-0052988

(51) Int. Cl.
*G06F 3/044* (2006.01)

(52) U.S. Cl.
CPC .. *G06F 3/0447* (2019.05); *G06F 2203/04102* (2013.01); *G06F 2203/04107* (2013.01)

(58) Field of Classification Search
CPC ......... G06F 3/0447; G06F 2203/04102; G06F 2203/04107
See application file for complete search history.

(56) References Cited

U.S. PATENT DOCUMENTS

| 2010/0072607 A1* | 3/2010 | Chung | ................... | H05K 3/361 |
| | | | | 257/692 |
| 2012/0105356 A1* | 5/2012 | Brosnan | ................ | G06F 3/0446 |
| | | | | 345/174 |

(Continued)

FOREIGN PATENT DOCUMENTS

| JP | 2003287767 | 10/2003 |
| KR | 100618898 | 9/2006 |

(Continued)

OTHER PUBLICATIONS

Hyoung-Joon Kim, et al., "Study on Bubble Formation in Rigid-Flexible Substrates Bonding using Anisotropic Conductive Films (ACFs) and Their Effects on the ACF Joint Reliability", Electronic Components and Technology Conference, (2006), pp. 952-958.

*Primary Examiner* — Wing H Chow
(74) *Attorney, Agent, or Firm* — Cantor Colburn LLP

(57) ABSTRACT

A display device includes a touch panel including touch and pad areas, and a touch printed circuit board including a contact portion in the pad area. The touch panel includes a touch signal line in the pad area, and the touch printed circuit board includes a touch lead signal line in the contact portion and connected to the touch signal line through an anisotropic conductive film. The touch lead signal line includes a first portion having a first width, a second portion having a second width smaller than the first width and a third portion between the first and second portions and having a third width between the first and second widths. An end of the touch signal line is on the first and third portions, and the third portion has a side profile having two or more different slopes.

20 Claims, 25 Drawing Sheets

(56) References Cited

U.S. PATENT DOCUMENTS

2013/0135239 A1* 5/2013 Yamazaki ............. H01L 27/124
                                                              345/173
2020/0266183 A1* 8/2020 Namkung ........... H01L 51/5237

FOREIGN PATENT DOCUMENTS

| KR | 100987826 | 10/2010 |
| KR | 1020130019211 | 2/2013 |
| KR | 1020180003716 | 1/2018 |

* cited by examiner

DISPLAY DEVICE INCLUDING TOUCH PANEL AND TOUCH PRINTED CIRCUIT BOARD

This application claims priority to Korean Patent Application No. 10-2019-0052988, filed on May 7, 2019, and all the benefits accruing therefrom under 35 U.S.C. § 119, the content of which in its entirety is herein incorporated by reference.

BACKGROUND

1. Field

The disclosure relates to a display device, and more particularly, to a display device including a plurality of members and adhesive members to couple the members to each other.

2. Description of the Related Art

Display devices are for displaying images and include a display panel such as an organic light-emitting display panel or a liquid-crystal display panel. Such a display device may include a window for protecting the display panel from an external impact. In particular, the window is frequently employed by portable electronic devices such as smart phones. Some portable electronic devices require a touch input feature. Such a display device may include a touch panel that performs the touch input feature. The window, the touch panel and the display panel may be attached to one another by an adhesive.

The touch panel and the display panel may receive an external signal through a printed circuit film or the like attached to their connection portions.

SUMMARY

Aspects of the disclosure provide a display device having structure to prevent bonding failure between signal lines disposed on the connection portions of a touch panel and lead lines on a touch printed circuit board connected to the signal lines.

According to an exemplary embodiment of the disclosure, bonding failure between signal lines disposed on the connection portions of a touch panel and lead lines on a touch printed circuit board connected to the signal lines is effectively prevented.

According to an exemplary embodiment of the disclosure, a display device includes a touch panel including a touch area and a pad area disposed at a side of the touch area of the touch panel; a touch printed circuit board including a contact portion attached on a surface of the pad area; an anisotropic conductive film disposed between the contact portion of the touch printed circuit board and the pad area of the touch panel; and a display panel disposed on the touch panel. In such an embodiment, the touch panel includes a touch signal line disposed in the pad area, the touch printed circuit board includes a touch lead signal line disposed in the contact portion and connected to the touch signal line through the anisotropic conductive film, and the touch lead signal line includes a first portion having a constant first width, a second portion having a second width smaller than the first width and a third portion disposed between the first portion and the second portion and having a third width between the first width and the second width. In such an embodiment, an end of the touch signal line is disposed on the third portion and the first portion, and an edge of the third portion has a side profile having two or more different slopes.

In an exemplary embodiment, the edge of the third portion may have a convex curved shape.

In an exemplary embodiment, the convex curved shape of the edge of the third portion may have a single curvature.

In an exemplary embodiment, the convex curved shape of the edge of the third portion may include a first portion connected to the first portion and having a first tangent slope and a second portion connected to the second portion and having a second tangent slope, and the first tangent slope may be greater than the second tangent slope.

In an exemplary embodiment, the edge of the third portion may include a first portion connected to the first portion and having a first slope and a second portion connected to the second portion and having a second slope, and the first slope may be greater than the second slope.

In an exemplary embodiment, the touch signal line may be provided in plural, the touch lead signal lines may be provided in plural, and the anisotropic conductive film is disposed between adjacent touch signal lines, which are spaced apart from each other, and between adjacent touch lead signal lines, which are spaced apart from each other.

In an exemplary embodiment, the adjacent touch signal lines and the anisotropic conductive film may be in direct contact with each other without any space therebetween, and the adjacent touch lead signal lines and the anisotropic conductive film may be in direct contact with each other without any space therebetween.

In an exemplary embodiment, the contact portion may include a first contact portion and a second contact portion spaced apart from the first contact portion, and the touch signal line may include a first touch signal line disposed on an upper surface of the pad area of the touch panel and a second touch signal line disposed on a lower surface of the pad area of the touch panel. In such an embodiment, the first touch signal line may be coupled to the first contact portion, and the second touch signal line may be coupled to the second contact portion.

In an exemplary embodiment, the display device may further include a display printed circuit board attached to the display panel, where the touch printed circuit board may be bent away from a display side of the display panel and electrically connected to the display printed circuit board.

In an exemplary embodiment, the display device may further include a main circuit board electrically connected to the display printed circuit board and the touch printed circuit board.

In an exemplary embodiment, the touch printed circuit board may further include a touch driving integrated circuit, and the second portion may be directly connected to the touch driving integrated circuit.

According to an exemplary embodiment of the disclosure, a display device includes a touch panel including a touch area and a pad area disposed at a side of the touch area; a touch printed circuit board including a contact portion attached on a surface of the pad area of the touch panel; and an anisotropic conductive film disposed between the contact portion of the touch printed circuit board and the pad area of the touch panel. In such an embodiment, the touch panel includes a touch signal line disposed in the pad area, the touch printed circuit board includes a touch lead signal line disposed in the contact portion and connected to the touch signal line through the anisotropic conductive film, and the touch lead signal line includes a first portion having a constant first width, a second portion having a second width smaller than the first width and a third portion disposed between the first portion and the second portion and having a third width between the first width and the second width. In such an embodiment, an end of the touch signal line is disposed on the third portion and the first portion, and an edge of the third portion includes a side profile having two or more different slopes.

In an exemplary embodiment, the edge of the third portion may have a convex curved shape.

According to an exemplary embodiment of the disclosure, a display device includes a touch panel including a touch area and a pad area disposed at a side of the touch area; a touch printed circuit board includes a contact portion attached on a surface of the pad area of the touch panel; an anisotropic conductive film disposed between the contact portion of the touch printed circuit board and the pad area of the touch panel; and a display panel disposed on the touch panel. In such an embodiment, the touch panel includes a touch signal line disposed in the pad area, the touch printed circuit board includes a touch lead signal line that is disposed in the contact portion and connected to the touch signal line through the anisotropic conductive film, and the touch lead signal line includes a first portion having a constant first width, a second portion having a second width smaller than the first width and a third portion disposed between the first portion and the second portion and having a third width between the first width and the second width. In such an embodiment, an end of the touch signal line is disposed on the first portion.

In an exemplary embodiment, the touch signal line may be provided in plural, the touch lead signal lines may be provided in plural, and the anisotropic conductive film may be disposed between adjacent touch signal lines, which are spaced apart from each other, and between adjacent touch lead signal lines, which are spaced apart from each other.

In an exemplary embodiment, the adjacent touch signal lines and the anisotropic conductive film may be in direct contact with each other without any space therebetween, and the adjacent touch lead signal lines and the anisotropic conductive film may be in direct contact with each other without any space therebetween.

In an exemplary embodiment, the contact portion may include a first contact portion and a second contact portion spaced apart from the first contact portion, and the touch signal lines may include a first touch signal line disposed on an upper surface of the pad area of the touch panel and a second touch signal line disposed on a lower surface of the pad area of the touch panel. In such an embodiment, the first touch signal line may be coupled to the first contact portion, and the second touch signal line may be coupled to the second contact portion.

In an exemplary embodiment, the display device may further include a display printed circuit board attached to the display panel, where the touch printed circuit board may be bent away from a display side of the display panel and electrically connected to the display printed circuit board.

In an exemplary embodiment, the display device may further include a main circuit board electrically connected to the display printed circuit board and the touch printed circuit board.

In an exemplary embodiment, the touch printed circuit board may further include a touch driving integrated circuit, and the second portion may be directly connected to the touch driving integrated circuit.

BRIEF DESCRIPTION OF THE DRAWINGS

The above and other features of the disclosure will become more apparent by describing in detail exemplary embodiments thereof with reference to the attached drawings, in which.

DETAILED DESCRIPTION

Figure 1:
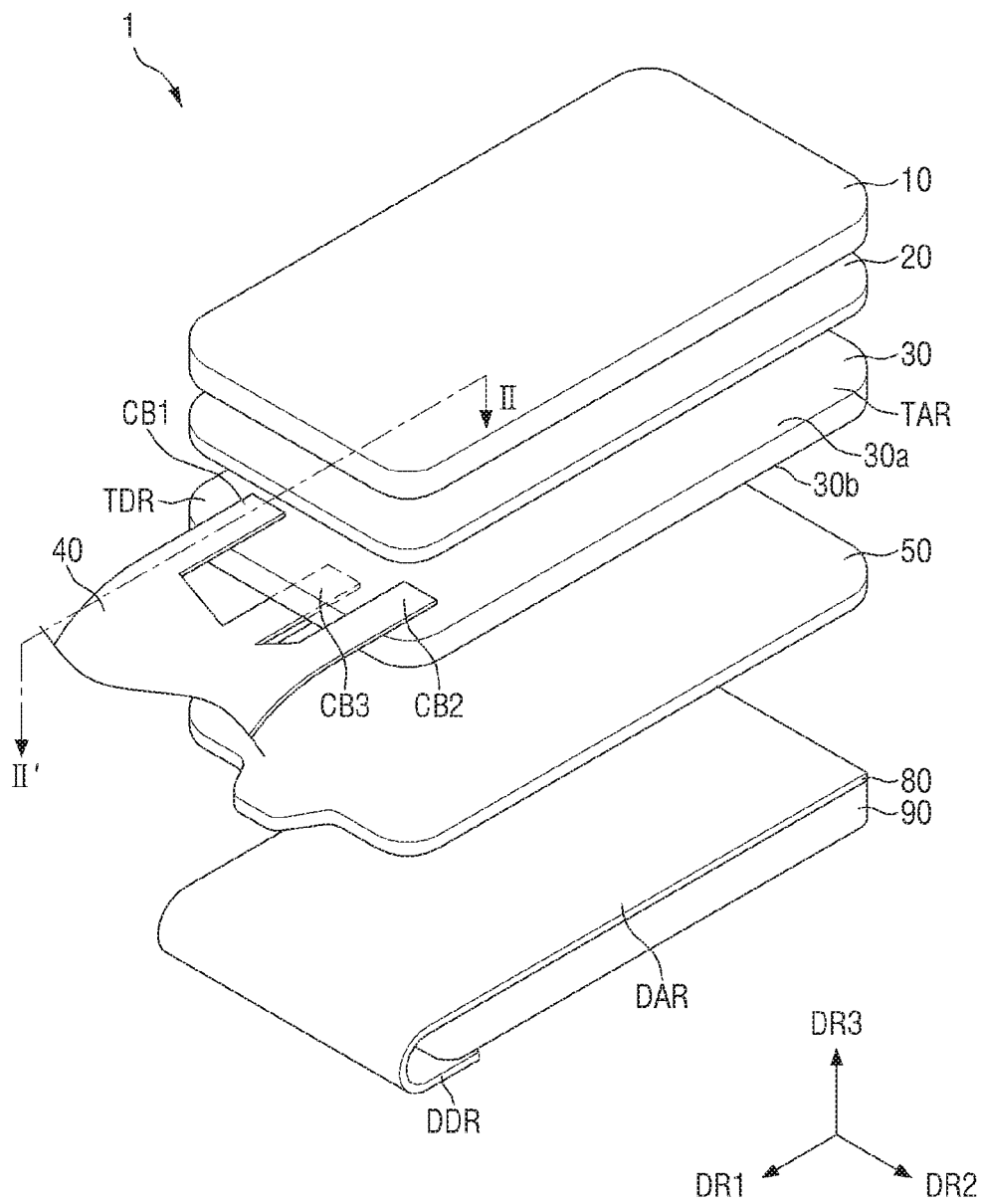
FIG. 1 is an exploded, perspective view of a display device according to an exemplary embodiment of the disclosure.

The invention will now be described more fully hereinafter with reference to the accompanying drawings, in which preferred embodiments of the invention are shown. This invention may, however, be embodied in different forms and should not be construed as limited to the embodiments set forth herein. Rather, these embodiments are provided so that this disclosure will be thorough and complete, and will filly convey the scope of the invention to those skilled in the art. Like reference numerals refer to like elements throughout.

It will be understood that when an element is referred to as being "on" another element, it can be directly on the other element or intervening elements may be therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." "At least one of A and B" means "A and/or B." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system).

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the claims.

Hereinafter, exemplary embodiments of the disclosure will be described in detail with reference to the accompanying drawings.

Figure 2:
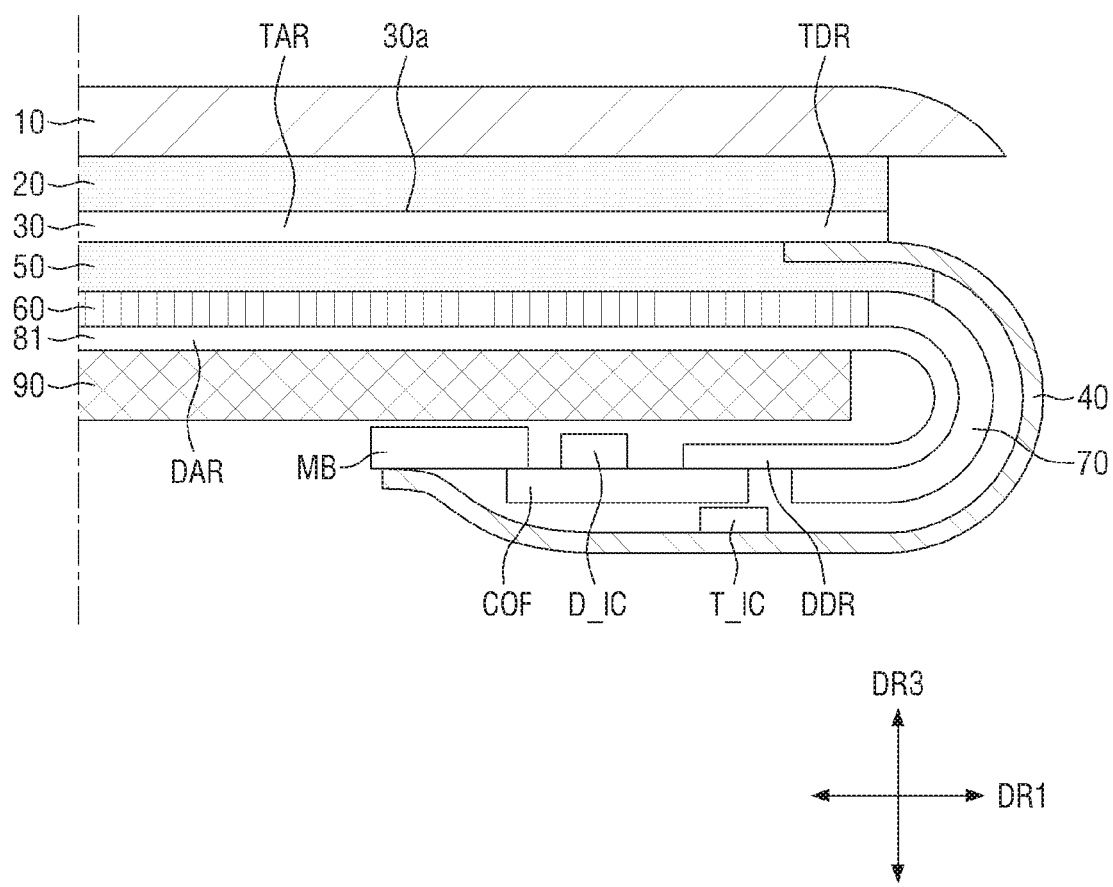
FIG. 2 is a cross-sectional view taken along line II-II' of FIG. 1.
Figure 3:
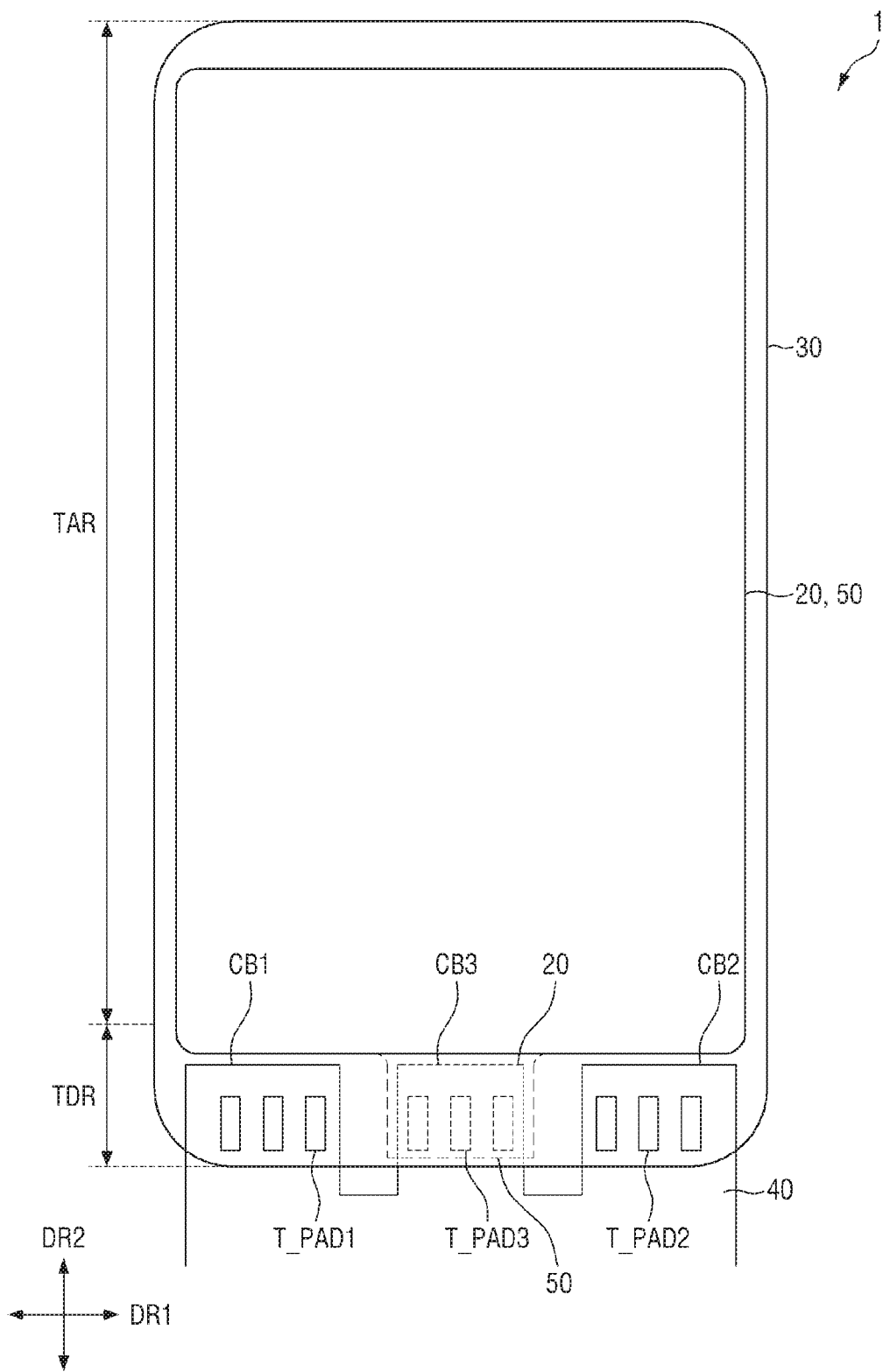
FIG. 3 is a plan view showing a layout of a touch panel and a touch printed circuit board.
Figure 4:
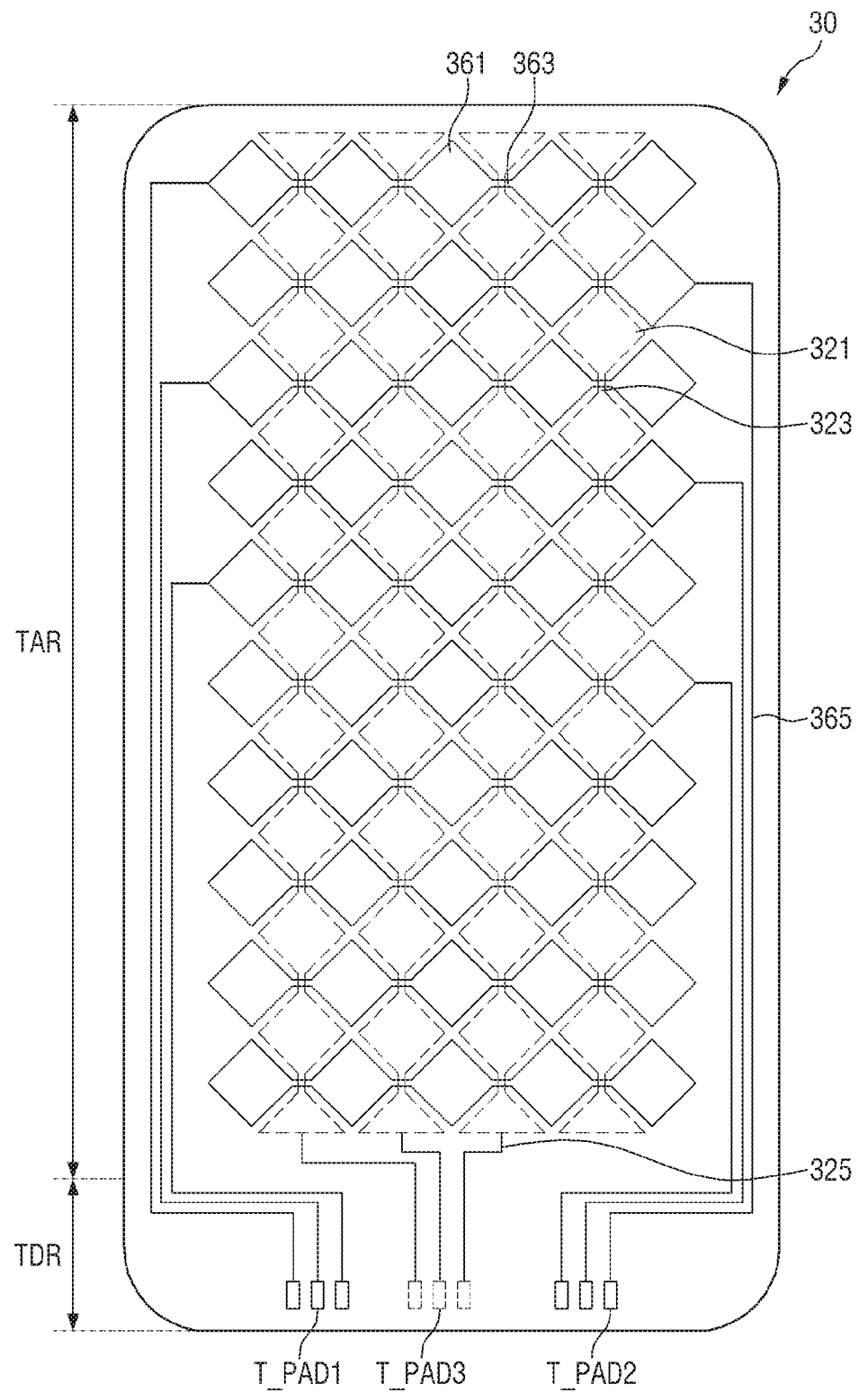
FIG. 4 is a plan view of a touch panel according to an exemplary embodiment of the disclosure.
Figure 5:
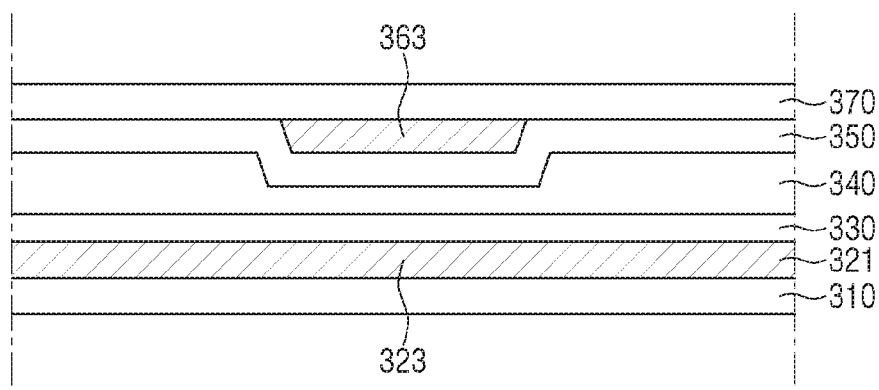
FIG. 5 is a cross-sectional view of a touch panel according to an exemplary embodiment of the disclosure.

FIG. 1 is an exploded, perspective view of a display device according to an exemplary embodiment of the disclosure. FIG. 2 is a cross-sectional view taken along line II-II' of FIG. 1. FIG. 3 is a plan view showing a layout of a touch panel and a touch printed circuit board. FIG. 4 is a plan view of a touch panel according to an exemplary embodiment of the disclosure. FIG. 5 is a cross-sectional view of a touch panel according to an exemplary embodiment of the disclosure.

Referring to FIGS. 1 to 5, an exemplary embodiment of a display device 1 includes a display panel 80, a touch panel 30, a window 10, a first optically transparent adhesive member 20 and a second optically transparent adhesive member 50.

The display panel 80 is a panel for displaying an image by receiving a data signal. In an exemplary embodiment, the display panel 80 may be an organic light-emitting display panel, a liquid-crystal display panel, a plasma display panel, or an electrophoretic display panel. Hereinafter, for convenience of description, exemplary embodiments where the display panel 80 is an organic light-emitting display panel will be described in detail.

The display panel 80 may include a display area DAR and a driving area DDR.

The display area DAR includes a plurality of pixels. Each of the pixels may include an emissive layer and a circuit layer for controlling the amount of light emitted from the emissive layer. The circuit layer may include display lines, display electrodes, and at least one transistor. The emissive layer may include an organic light-emitting material. The emissive layer may be sealed by an encapsulation layer. The encapsulation layer may seal the emissive layer to prevent moisture and the like from being introduced from the outside. The encapsulation layer may include or be defined by a single inorganic layer or multiple layers stacked on one another, or a stack of inorganic layers and organic layers alternately stacked on one another.

The display area DAR may further include an optical film 60 disposed on the encapsulation layer. The optical film 60 may be disposed in the display area DAR and not in the driving area DDR disposed on one side of the display area DAR, but not being limited thereto. The optical film 60 may be disposed on a part of the driving area DDR.

The optical film 60 may include a plurality of films stacked on one another.

The display area DAR may have a rectangular shape or a rectangular shape with rounded corners. However, embodiments of the disclosure are not limited thereto. The display area DAR may have one of various shapes such as a square or other polygonal or circular shape, elliptical shape, etc.

The driving area DDR is disposed around the display area DAR, for example, on one side thereof. The driving area DDR may be a non-display area where no image is displayed. Unlike the display area DAR, the driving area DDR may include no pixel. In an exemplary embodiment, where the display area DAR has a rectangular shape with rounded corners, the driving area DDR is disposed adjacent to at least one side of the rectangular shape of the display area DAR. In an exemplary embodiment, as shown in the drawings, the driving area DDR is disposed adjacent to one shorter side of the display area DAR, for example. The driving area DDR may include a driving line connected to the display line of the pixel, and a pad of the driving line. External components such as a driving chip and a printed circuit board may be mounted on the driving line pads as described later.

In an exemplary embodiment, the display panel 80 may include a substrate 81. The substrate 81 may be a flexible substrate including or made of a flexible plastic material such as polyimide. The circuit layer and the emissive layer of the display area DAR may be disposed on a surface of the substrate 81. In such an embodiment, where the substrate 81 has flexibility, the substrate 81 may be bent at the driving area DDR. In one exemplary embodiment, for example, the substrate 81 of the driving area DDR disposed adjacent to the shorter side of the display area DAR may be bent away from the display surface toward the rear surface of the display area DAR. The bent driving area DDR may partially overlap the display area DAR. The bent surface of the substrate 81 may face the opposite side to the surface of the substrate 81 of the display area DAR. In such an embodiment, the surface of the substrate 81 of the display area DAR may face the upper side, while the bent surface of the substrate 81 may face the lower side.

The driving line of the driving area DDR may extend along the bending area, and the driving line pad may be disposed on the overlapping area of the display part DAR and the bending driving part DDR.

The driving area DDR of the display panel 80 may include a bending protective layer 70. The bending protective layer 70 may be disposed on one side of the optical film 60 and may be spaced apart from the optical film 60. However, embodiments of the disclosure are not limited thereto. The bending protective layer 70 may be disposed in contact with the optical film 60.

The bending protective layer 70 covers and protects the driving line. In an exemplary embodiment, the bending protective layer 70 may reinforce the strength of the flexible substrate 81 or may relieve the stress in the bending area. The bending protective layer 70 exposes the driving line pad portion.

In an exemplary embodiment, the bending protective layer 70 may include an organic coating layer such as polyimide, acrylate and epoxy. In an alternative exemplary embodiment, the bending protective layer 70 may be attached in the form of a protective film.

The driving line pads in the driving area DDR of the display panel 80 may be electrically connected to the display printed circuit board COF. In one exemplary embodiment, for example, the driving line pads may be disposed on a surface of the substrate 81, and the display printed circuit board COF may be attached to the driving line pads by an anisotropic conductive film ("ACF") or the like. The display printed circuit board COF may be a film-type flexible printed circuit board. A driving chip D_IC may be mounted on the display printed circuit board COF. The display printed circuit board COF may be implemented as a chip-on-film type, a tape-carrier-package type, or the like.

The display printed circuit board COF may be electrically connected to a main circuit board MB. The main circuit board MB may include or be made of a rigid printed circuit board. The main circuit board MB and the display printed circuit board COF may be attached to each other by an ACF or the like.

A touch panel 30 is disposed on the display panel 80. The touch panel 30 includes a lower surface 30b facing the display panel 80 and an upper surface 30a opposed to the lower surface 30b. The touch panel 30 may acquire position information of an input point thereon by a capacitive method, a resistive film method, an electromagnetic induction method or an infrared method, for example. In an exemplary embodiment, the touch panel 30 may be a capacitive touch panel, but not being limited thereto.

The touch panel 30 may overlap the display area DAR and a part of the driving area DDR of the display panel 80. The touch panel 30 may not overlap the portion of the substrate 81 of the display panel 80 beyond the bending portion.

The touch printed circuit board 40 may be attached to the touch panel 30. The touch printed circuit board 40 may include a plurality of touch lead signal lines and a touch driving integrated circuit T_IC electrically connected to the plurality of touch lead signal lines. The touch driving integrated circuit T_IC may be a driving chip. The touch printed circuit board 40 may be electrically connected to the display printed circuit board COF through the main circuit board MB.

The touch panel 30 may include touch electrodes and/or touch lines.

Referring to FIGS. 4 and 5, the touch panel 30 includes a touch area TAR and a pad area TDR. In an exemplary embodiment, where the touch panel 30 has a rectangular shape when viewed from a top plan view or a plan view in a thickness direction thereof, the touch panel 30 may include four side portions adjacent to the sides, respectively. The pad area TDR may be located on one of the side portions adjacent to one shorter side of the touch panel 30 when viewed from the top plan view. The pad area TDR may be disposed on one side of the touch area TAR. In one exemplary embodiment, for example, the pad area TDR may be located on one side of the touch area TAR in a first direction DR1. Here, the first direction DR1 may be a direction of a long side of the display device 1, a second direction DR2 may be a direction of a short side of the display device 1, and a third direction DR3 may be a direction perpendicular to the first and second directions DR1 and DR2 or a thickness direction of the display device 1. The touch area TAR of the touch panel 30 is disposed to overlap the display portion DAR of the display panel 80. The pad side portion TAR of the touch panel 30 is disposed to overlap the display portion DAR of the display panel 80.

The touch panel 30 may include a first touch protective layer 310, a first line layer 320 disposed on the first touch protective layer 310, a first touch insulation layer 330 disposed on the first line layer 320, a second touch insulating layer 350 disposed on the first touch insulating layer 330, a second line layer 360 disposed on the second touch insulating layer 350, and a second touch protective layer 370 disposed on the second line layer 360. The touch panel 30 may further include a touch coupling layer 340 that is disposed between the first touch insulating layer 330 and the second touch insulating layer 350 to couple them. The first line layer 320 and the second line layer 360 include a plurality of electrodes 321, 323, 325, 361, 363, 365, T_PAD1, T_PAD2 and T_PAD3.

The first touch protective layer 310 may cover and protect the first line layer 320. The first touch protective layer 310 may be a solder resist layer. The solder resist layer may include or be made of an organic material such as polyethylene terephthalate ("PET"), polyimide ("PI"), polycarbonate ("PC"), polyethylene ("PE"), polypropylene ("PP"), polysulfone ("PSF"), polymethylmethacrylate ("PMMA"), triacetylcellulose ("TAC") and cycloolefin polymer ("COP").

The first line layer 320 is disposed on a surface of the first touch protective layer 310. The first line layer 320 may include first touch electrodes 321, first connection electrodes 323 connecting between the adjacent ones of the first touch electrodes 321, first touch signal lines 325, and third touch signal pads T_PAD3.

The first touch electrodes 321, the first connection electrodes 323 connecting between the first touch electrodes 321 and the first touch signal lines 325 may be disposed in the touch area TAR of the touch panel 30, while the third touch signal pads T_PAD3 may be disposed in the driving area DDR of the touch panel 30. The first touch signal lines 325 may electrically connect the first touch electrodes 321 with the third touch signal pads T_PAD3.

The first touch electrodes 321 adjacent to one another in the column direction are physically connected to one another through the first connection electrodes 323. The width of the first connection electrodes 323 may be smaller than the width of the first touch electrodes 321.

The first touch signal lines 325 are connected to the first touch electrodes 321 and extend toward the pad area TDR, and an end portion of the first touch signal lines 325 at the pad area TDR define the third touch signal pads T_PAD3 at the pad area TDR. The first touch protective layer 310 exposes a surface of the first touch signal line 325 at the driving area DDR of the touch panel 30. The exposed surface of the end portion of the first touch signal line 325 may define the third touch signal pad T_PAD3. The touch printed circuit board 40 may be electrically connected to the exposed third touch signal pad T_PAD3.

The touch printed circuit board 40 may be a flexible printed circuit board. The touch printed circuit board 40 may include first to third contact portions CB1 to CB3. A first contact portion CB located at one end of the touch printed circuit board 40 may be attached to the third touch signal pads T_PAD3 of the touch panel 30 by an ACF or the like. The touch printed circuit board 40 may include a base film 41 and a plurality of touch lead lines LE1 to LE3 disposed on the base film 41. The third touch lead lines LE3 may be coupled to the third touch signal pads T_PAD3. The first touch lead lines LE1 may be coupled to first touch signal pads T_PAD1 to be described later, and the second touch lead lines LE2 may be coupled to second touch signal pads T_PAD2 to be described later.

The touch printed circuit board 40 may be bent in a way such that the touch printed circuit board 40 surrounds the bending portion of the substrate 81 of the display panel 80 on an outer side thereof, as shown in FIG. 2. An end of a bent portion of the touch printed circuit board 40 may be electrically connected to the main circuit board MB.

The third touch signal pads T_PAD3 may be located at the center of the pad area TDR when viewed from the top plan view. The first touch signal pads T_PAD1 and the second touch signal pads T_PAD2 to be described later may be disposed with the third touch signal pads T_PAD3 therebetween. The third touch signal pads T_PAD3 may have a slightly expanded shape than the first touch signal lines 325 for connection with the touch printed circuit board 40, but this is merely illustrative.

The first touch insulating layer 330 is disposed on the first line layer 320. The first touch insulating layer 330 may be disposed over the entire surface of the first line layer 320.

The touch coupling layer 340 may be disposed on the first touch insulating layer 330. The touch coupling layer 340 may include or be made of a material that is well known in the art as an adhesive material to couple the first touch insulating layer 330 with the second touch insulating layer 350. In one exemplary embodiment, for example, the touch coupling layer 340 may include a material for forming transparent adhesive members, which will be described later.

The second touch insulating layer 350 may be disposed on the touch coupling layer 340. Each of the first touch insulating layer 330 and the second touch insulating layer 350 may include or be made up of a single layer or multiple layers. In such an embodiment, each of the first touch insulating layer 330 and the second touch insulating layer 350 may include an inorganic material, an organic material, or a composite material. In an exemplary embodiment, the first touch insulating layer 330 and/or the second touch insulating layer 350 may include an inorganic layer. The inorganic layer may include at least one of aluminum oxide, titanium oxide, silicon oxide, silicon oxynitride, zirconium oxide, and hafnium oxide.

In an alternative exemplary embodiment, the first touch insulating layer 330 and/or the second touch insulating layer 350 may include an organic layer. The organic layer may include at least one selected from the group consisting of: an acrylic resin, a methacrylic resin, a polyisoprene, a vinyl resin, an epoxy resin, a urethane resin, a cellulose resin, a siloxane resin, a polyimide resin, a polyamide resin, and a perylene resin.

The second line layer 360 may be disposed on the second touch insulating layer 350. The second line layer 360 may include second touch electrodes 361, second connection electrodes 363 for connecting the adjacent ones of the second touch electrodes 361 to each other, second touch signal lines 365, the first touch signal lines T_PAD1, and second touch signal lines T_PAD2. The first touch electrodes 321 and the second touch electrodes 361 may acquire positional information of a touched point by self-capacitance sensing and/or mutual capacitance sensing.

The second touch electrodes 361, the second connection electrodes 363 for connecting adjacent ones of the second touch electrodes 361 to each other and the second touch signal lines 365 may be disposed in the touch area TAR of the touch panel 30, while the first touch signal lines T_PAD1 and the second touch signal lines T_PAD2 may be disposed in the pad side portion DDR of the touch panel 30. The second touch signal lines 365 may electrically connect the second touch electrodes 361 with the first touch signal lines T_PAD1 and the second touch electrodes 361 with the second touch signal lines T_PAD2. The first touch signal lines T_PAD1 may be disposed on a side of the third touch signal lines T_PAD3 with respect to a direction extending from the pad area TDR to the touch area TAR when viewed from a top plan view. The second touch signal lines T_PAD2 may be disposed on the other side of the third touch signal lines T_PAD3 with respect to the direction extending from the pad area TDR to the touch area TAR when viewed from the top plan view. In one exemplary embodiment, for example, the first touch signal lines T_PAD1 may be disposed on a side of the third touch signal lines T_PAD3 with respect to a second direction DR2 when viewed from a top plan view, while the second touch signal lines T_PAD2 may be disposed on an opposing side of the third touch signal lines T_PAD3 with respect to the second direction DR2.

The second touch electrodes 361 adjacent to one another in a row direction are physically connected to one another through the second connection electrodes 363. The width of the second connection electrodes 363 may be smaller than the width of the second touch electrodes 361.

The second touch signal lines 365 are connected to the second touch electrodes 361 and extends toward the pad area TDR, and an end portion of the second touch signal lines 365 at the pad area TDR define the first touch signal pads T_PAD1 and the second touch signal pads T_PAD2. The second touch protective layer 370 may expose a surface of the end portion of the second touch signal lines 365 at the pad area TDR of the touch panel 30. The exposed surface of the end portion of the second touch signal lines 365 may define the first touch signal pads T_PAD1 or the second touch signal pads T_PAD2. The first and second touch signal pads T_PAD1 and T_PAD2 may be arranged in the first direction DR1.

The touch printed circuit board 40 may be electrically connected to the exposed first and second touch signal pads T_PAD1 and T_PAD2. The first contact portion CB1 of the touch printed circuit board 40 may be attached to the first touch signal pads T_PAD1 by an ACF, etc., and the second contact portion CB2 may be attached to the second touch signal pads T_PAD2 by an ACF, etc.

The first and second touch signal pads T_PAD1 and T_PAD2 may have a slightly expanded shape than the second touch signal lines 365 for connection with the touch printed circuit board 40, but the disclosure is not limited thereto.

The first touch electrodes 321 and the second touch electrodes 322 may be arranged in a matrix from when viewed from the top plan view. Each of the first touch electrodes 321 and the second touch electrodes 322 may have, but is not limited to, a diamond-like shape. The first touch electrodes 321 may be electrically connected to one another in the column direction (longer side direction or the first direction DR1), and the second touch electrodes 322 may be electrically connected to one another in the row direction (shorter side direction or the second direction DR2). However, embodiments of the disclosure are not limited thereto. Alternatively, the first touch electrodes 321 may be electrically connected to one another in the row direction, and the second touch electrodes 322 may be electrically connected to one another in the column direction. The first touch electrodes 321 and the second sensing electrodes 322 are spaced apart and isolated from one another by the touch insulating layers 330 and 350 disposed therebetween.

Each of the first line layer 320 and the second line layer 360 may include or be made of a conductive material. In one exemplary embodiment, for example, the first line layer 320 and the second line layer 360 may include or be made of a material including a transparent conductive oxide such as indium tin oxide ("ITO"), indium zinc oxide ("IZO"), zinc oxide (ZnO) or indium tin zinc oxide ("ITZO"); a metal such as molybdenum, silver, titanium, copper, aluminum and an alloy thereof, a conductive polymer such as poly(3,4-ethylenedioxythiophene) ("PEDOT"), metal nanolines, carbon nanotubes, graphene, etc.

In an exemplary embodiment, the first line layer 320 and the second line layer 360 may include an opaque material, and the first touch electrode 321 and the second touch electrode 322 may have a mesh shape.

The window 10 is disposed on the touch panel 30. The window 10 serves to cover and protect the touch panel 30 and/or the display panel 80. In an exemplary embodiment, the window 10 completely covers or overlaps the touch panel 30. The window 10 may be larger than the touch panel 30 and the side surfaces thereof may protrude from the side surfaces of the touch panel 30, respectively. In such an embodiment, the window 10 may completely overlap the display area DAR of the display panel 80 as well as the driving area DDR. The window 10 may be larger than the display panel 80 and the side surfaces thereof may protrude from the sides of the display panel 80, respectively. The window 10 may cover even the bending portion of the substrate 81 of the display panel 80.

The window 10 may include or be made of a transparent material. The window 10 may include, for example, a glass or a plastic. In an exemplary embodiment, where the window 10 includes plastic, the window 10 may be flexible.

In an exemplary embodiment, the window 10 may include, but are not limited to, a plastic material such as polyimide, polyacrylate, PMMA, PC, PEN, polyvinylidene chloride, PVDF, polystyrene, ethylene vinylalcohol copolymer, PES, PEI, PPS, polyallylate, TAC, CAP and the like. The plastic window 10 may include one or more of the plastic materials listed above.

in an exemplary embodiment, where the window 10 includes a plastic film, the window 10 may further include a coating layer (not shown) disposed on each of the upper and lower surfaces of the plastic film. In an exemplary embodiment, the coating layers may be a hard coating layer including an organic layer containing an acrylate compound and/or an organic-inorganic hybrid layer. The organic layer may include an acrylate compound. The organic-inorganic hybrid layer may be a layer in which an inorganic material such as silicon oxide, zirconium oxide, aluminum oxide, tantalum oxide, niobium oxide and glass beads is dispersed in an organic material such as an acrylate compound. In an alternative exemplary embodiment, the coating layer may include a metal oxide layer. The metal oxide layer may include, but is not limited to, metal oxides such as titanium, aluminum, molybdenum, tantalum, copper, indium, tin and tungsten.

The first transparent adhesive member 20 is disposed between the window 10 and the touch panel 30. The window 10 and the touch panel 30 may be coupled or attached to each other by the first transparent adhesive member 20. The second transparent adhesive member 50 is disposed between the touch panel 30 and the display panel 80. The touch panel 30 and the display panel 80 may be coupled or attached to each other by the second transparent adhesive member 50.

Each of the first transparent adhesive member 20 and the second transparent adhesive member 50 may include or be made of an optically transparent adhesive film, an optically transparent adhesive tape or an optically transparent resin.

The first transparent adhesive member 20 and the second transparent adhesive member 50 may include or be made of a same material as each other, but they may have different properties. In one exemplary embodiment, for example, the first transparent adhesive member 20 may have a lower modulus than the second transparent adhesive member 50.

The display device 1 may further include a cover panel sheet 90. The cover panel sheet 90 may be attached to the rear surface of the display area DAR of the display panel 80. The cover panel sheet 90 includes at least one functional layer. The functional layer may perform a heat dissipation function, an electromagnetic wave shielding function, a grounding function, a buffering function, a strength enhancing function, a supporting function, and/or a digitizing function. The functional layer may be a sheet layer including or made of a sheet, a film layer including or made of a film, a thin film layer, a coating layer, a panel, a plate, etc. A single functional layer may include or be made up of a single layer or a plurality of thin films or coating layers stacked on one another. The functional layer may be, for example, a supporting substrate, a heat-radiating layer, an electromagnetic wave shielding layer, a shock absorbing layer, a digitizer, etc.

The bent substrate 81 of the driving area DDR of the display panel 80, the display printed circuit board COF, and the main circuit board MB connected thereto may be located under the cover panel sheet 90. The bent touch printed circuit board 40 may also be located under the cover panel sheet 90.

The lower surface of the cover panel sheet 90 may be coupled to the other surface of the bent substrate 81 and/or the main circuit board MB by an adhesive layer, but is not limited thereto.

The shape of the touch panel 30 may generally conform to the shape of the display area DAR of the display panel 80 when viewed from the top plan view. In an exemplary embodiment, where the display area DAR of the display panel 80 has a rectangular shape with rounded corners, the shape of the touch panel 30 may also have a rectangular shape with rounded corners when viewed from the top plan view. The side surface of the pad area TDR of the side surfaces of the touch panel 30 may have a straight line shape when viewed from the top plan view.

In an exemplary embodiment, the upper surface 30*a* of the pad area TDR of the touch panel 30 may include a first connection area to which the first contact portion CB1 of the touch printed circuit board 40 is attached, and a second connection area to which the second contact portion CB2 of the touch printed circuit board 40 is attached.

The plurality of first touch signal pads T_PAD1 and the plurality of second touch signal pads T_PAD2 are disposed in the first connection area and the second connection area, respectively.

In such an embodiment, the lower surface 30*b* of the pad area TDR of the touch panel 30 may include a third connection area to which the third contact portion CB3 of the touch printed circuit board 40 is attached.

The plurality of third touch signal pads T_PAD3 is disposed in the third connection area.

The first connection area and the second connection area may be spaced apart from each other with the third connection area therebetween.

In an exemplary embodiment, the side surface of the pad area TDR of the touch panel 30 may not be a straight line when viewed from the top plan view. In one exemplary embodiment, for example, the profile of the side surface of the pad area TDR of the touch panel 30 when viewed from the top plan view may include a reference line and a protrusion protruding outward from the reference line. The protrusion of the pad area TDR may be disposed to correspond to the first to third connection areas.

The first transparent adhesive member 20 is disposed on the upper surface 30*a* of the touch panel 30 while the second transparent adhesive member 50 is disposed on the lower surface 30*b* of the touch panel 30. The first transparent adhesive member 20 and the second transparent adhesive member 50 have a shape generally similar to the touch panel 30 when viewed from the top plan view. The first and second transparent adhesive members 20 and 50 may substantially overlap the touch area TAR of the touch panel 30.

In an exemplary embodiment, the side surface of each of the first transparent adhesive member 20 and the second transparent adhesive member 50 may be disposed more inwardly than the side surface of the touch panel 30. In such an embodiment, the side surface of the touch panel 30 may protrude outwardly from the side surface of the first transparent adhesive member 20 and the side surface of the second transparent adhesive member 50.

Therefore, in such an embodiment, the edge of one surface of the touch panel 30 may not be covered by the first transparent adhesive member 20, and the edge of an opposing surface of the touch panel 30 may not be covered by the second transparent adhesive member 50. As the first and second transparent adhesive members 20 and 50 are not completely cover the side surface of the touch panel 30 as described above, it the overflow of the adhesive material may be effectively prevented.

The side surface of each of the first transparent adhesive member 20 and the second transparent adhesive member 50 may have a shape with a straight line in parallel with the side surface of the touch panel 30 on the sides other than the pad area TDR of the touch panel 30. The first transparent adhesive member 20 and the second transparent adhesive member 50 may have a same shape on the sides other than the pad area TDR of the touch panel 30 when viewed from the top plan view. On the sides opposite to the pad area TDR, the side surface of the first transparent adhesive member 20 may be aligned with the side surface of the second transparent adhesive member 50 without being protruded.

On the pad area TDR of the touch panel 30, the second transparent adhesive member 50 may partially protrude outwardly from the first transparent adhesive member 20, as shown in FIG. 2.

The touch printed circuit board 40 is attached on the touch signal pads T_PAD1 to T_PAD3 of the touch panel 30 as described above. The touch printed circuit board 40 may include a plurality of touch lead signal lines. The plurality of touch lead signal lines may be coupled to the touch signal pads T_PAD1 to T_PAD3 by overlapping the touch signal pads T_PAD1 to T_PAD3 in the thickness direction via an anisotropic conductive film.

The anisotropic conductive film may also couple one of the touch signal pads T_PAD1 to T_PAD3 to one of the touch lean signal lines which is adjacent thereto, and couple the touch lead signal lines to the touch signal pads T_PAD1 to T_PAD3 overlapping the touch lead signal lines in the thickness direction. The touch lead signal lines may include a plurality of portions having different widths at different positions.

Conventionally, the portions of the touch lead signal lines that are coupled to the touch signal pads T_PAD1 to T_PAD3 may have a width larger than that of the other portions thereof that are not coupled to the touch signal pads T_PAD1 to T_PAD3, for easy coupling. However, as the width of the touch lead signal line is different in the portion where the touch lead signal line is coupled to the touch signal pads T_PAD1 to T_PAD3, a vortex may occur at such a portion, such that bubbles may be generated in the anisotropic conductive film disposed therebetween during the process of attaching the touch panel 30 to the touch printed circuit board 40. The bubbles of the anisotropic conductive film may weaken coupling force between the touch lead signal lines and the touch signal pads T_PAD1 to T_PAD3, such that the bonding reliability may be lowered.

In an exemplary embodiment of the display device 1 according to the disclosure, the touch lead signal lines have a constant width at the portion where the touch lead signal lines are coupled to the touch signal pads T_PAD1 to T_PAD3, such that the bonding reliability may be effectively prevented from being lowered due to the bubbles.

Figure 6A:
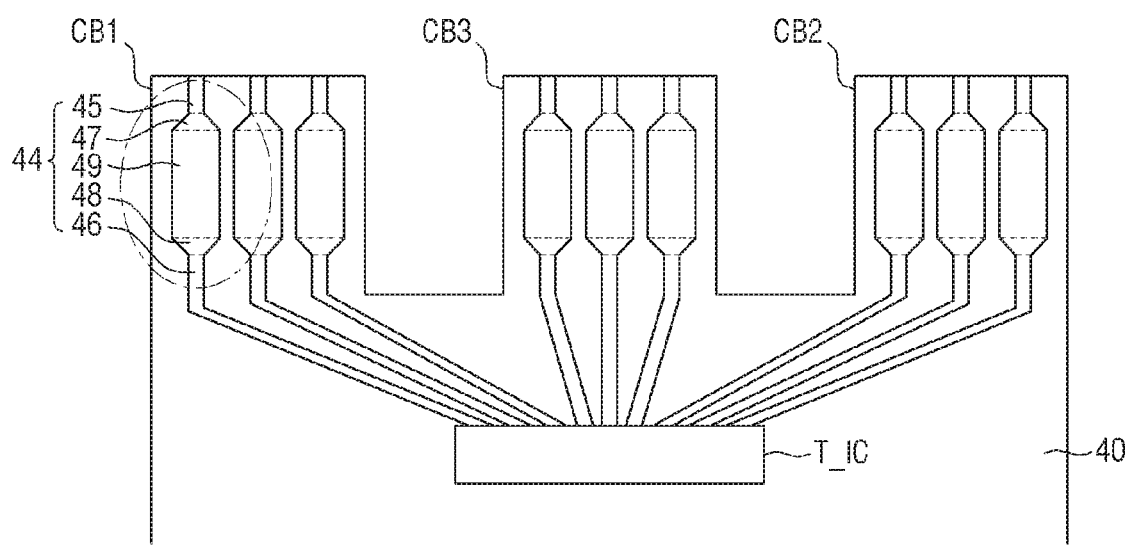
FIG. 6A is a plan view showing a layout of touch read signal lines of a touch printed circuit board according to an exemplary embodiment of the disclosure.
Figure 6B:
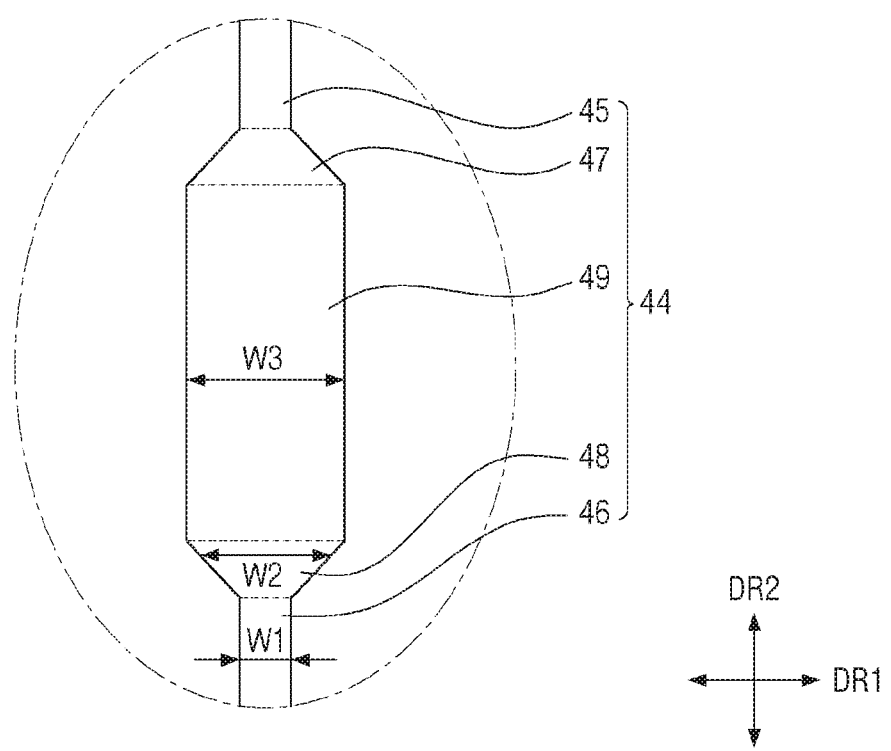
FIG. 6B is an enlarged view of the encircled portion of FIG. 6A.
Figure 7A:
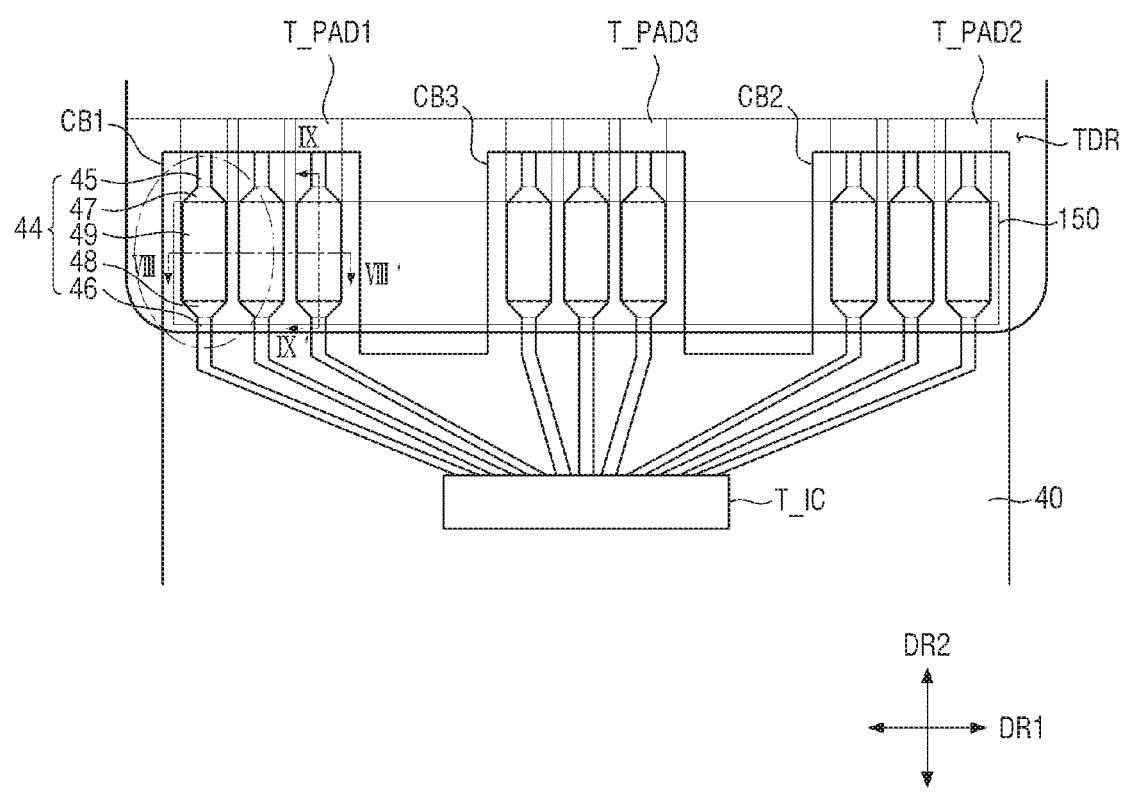
FIG. 7A is a plan view showing a touch panel and a touch printed circuit board attached together according to an exemplary embodiment of the disclosure.
Figure 7B:
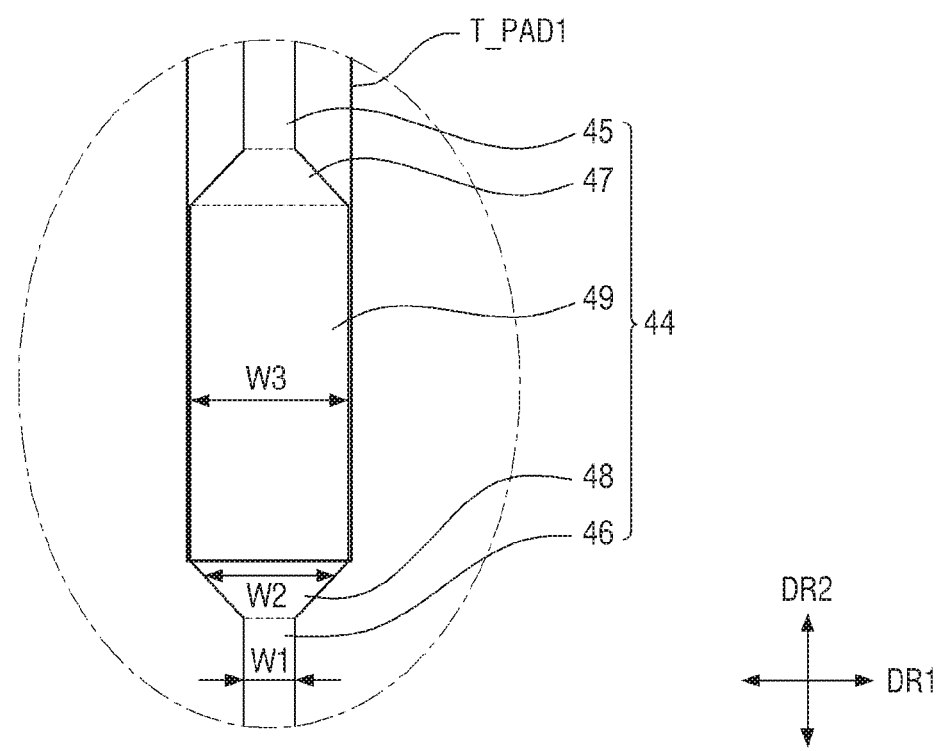
FIG. 7B is an enlarged view of the encircled portion of FIG. 7A.
Figure 8A:
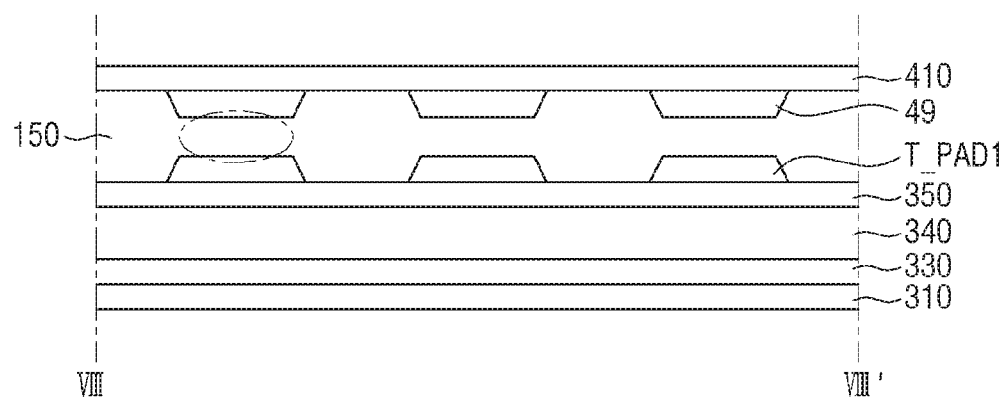
FIG. 8A is a cross-sectional view taken along line VIII-VIII' of FIG. 7.
Figure 8B:
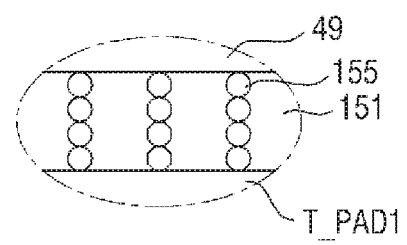
FIG. 8B is an enlarged view of the encircled portion of FIG. 8A.
Figure 9:
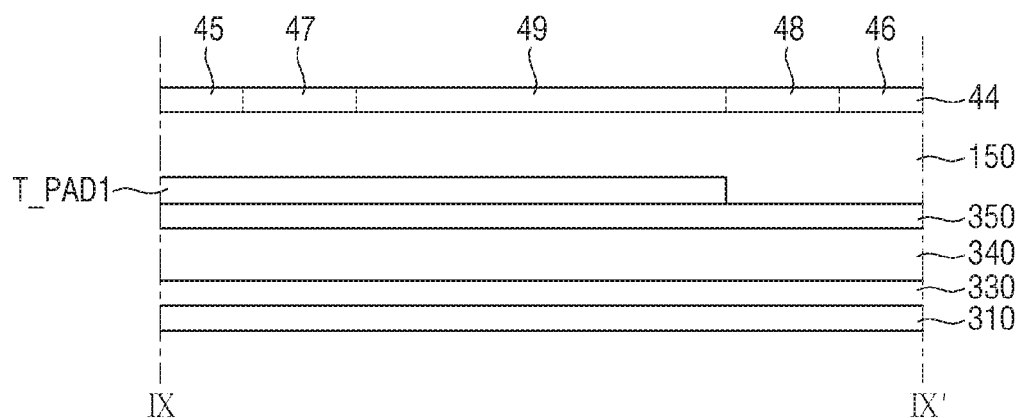
FIG. 9 is a cross-sectional view taken along line IX-IX' of FIG. 7.

FIG. 6A is a plan view showing a layout of touch read signal lines of a touch printed circuit board according to an exemplary embodiment of the disclosure. FIG. 6B is an enlarged view of the encircled portion of FIG. 6A. FIG. 7A is a plan view showing a touch panel and a touch printed circuit board attached together according to an exemplary embodiment of the disclosure. FIG. 7B is an enlarged view of the encircled portion of FIG. 7A. FIG. 8A is a cross-sectional view taken along line VIII-VIII' of FIG. 7. FIG. 8B is an enlarged view of the encircled portion of FIG. 8A. FIG. 9 is a cross-sectional view taken along line IX-IX' of FIG. 7.

Referring to FIGS. 6A to 9, touch lead signal line 44 of the touch printed circuit board 40 may be electrically connected to the touch driving integrated circuit T_IC. The touch lead signal line 44 may include a plurality of portions having different widths in the first direction DR1. The touch lead signal line 44 disposed in the first contact portion CB1 will be mainly described for convenience of description. In an exemplary embodiment, The touch lead signal line 44 includes a first portion 45 located at the end of the first contact portion CB1, a second portion 46 directly connected to the touch driving integrated circuit T_IC, a third portion 47 disposed between the first portion 45 and the second portion 46, a fourth portion 48 disposed between the third portion 47 and the second portion 46, and a fifth portion 49 disposed between the third portion 47 and the fourth portion 48. The second portion 46 may have a first width W1, the fourth portion 48 may have a second width W2, and the fifth portion 49 may have a third width W3. The third width W3 and the first width W1 may be constant, and the second width W2 may be larger than the first width and smaller than the third width W3 and may become smaller toward the lower side with respect to the second direction DR2, i.e., away from the first contact portion CB1.

As shown in FIGS. 6A and 6B, the side profile of the fourth portion 48 has a straight line shape. In such an embodiment, the side profile of the fourth portion 48 is inclined with respect to the second portion 46 with a constant slope, and the second width W2 may be reduced at a constant rate while being away from the first contact portion CB1.

The first portion 45 and the third portion 47 of the touch lead signal line 44 may be symmetrical to the second portion 46 and the fourth portion 48, respectively, with reference to the fifth portion 49. However, embodiments of the disclosure are not limited thereto. The first portion 45 and the third portion 47 may have one of various shapes. In one exemplary embodiment, for example, the first portion 45 and the third portion 47 both may have the first width W1 like the second portion 46, may have the third width W3 like the fifth portion 49 or may have the varying second width W2 like the fourth portion 48.

Referring to FIGS. 7A and 7B, the first touch signal pad T_PAD1 may be disposed on the touch lead signal line 44. The first touch signal pad T_PAD1 may be disposed over the plurality of portions of the touch lead signal line 44. The first touch signal pad T_PAD1 may overlap in the thickness direction with the first portion 45, the third portion 47 and the fifth portion 49 of the touch lead signal line 44. In such an embodiment, an end of the first touch signal pad T_PAD1 may overlap the fifth portion 49 of the touch lead signal line 44. In FIGS. 7A and 7B, the end of the first touch signal pad T_PAD1 is aligned with one end of the fifth portion 49 of the touch lead signal line 44, and with the boundary between the fifth portion 49 and the fourth portion 48.

Referring to FIGS. 8A and 8B, an anisotropic conductive film 150 may be disposed between a base film 410 of the touch printed circuit board 40 and the second touch insulating layer 350. The anisotropic conductive film 150 may cover the lower surface and the side surfaces of the fifth portion 49 of the touch lead signal line 44 and may cover the upper surface and the side surfaces of the touch signal pad T_PAD1. In an exemplary embodiment, the anisotropic conductive film 150 may be disposed in a space with an adjacent touch lead signal line to be in direct contact with (or directly contact) each other. In such an embodiment, the anisotropic conductive film 150 may be disposed in the space between adjacent touch signal pads T_PAD1 to be in direct contact with each other.

In an exemplary embodiment, the anisotropic conductive film 150 may be in contact with the touch lead signal line 44 adjacent thereto without any space therebetween such as an empty space. In such an embodiment, the anisotropic conductive film 150 may be in contact with and the touch signal pad T_PAD1 adjacent thereto without any space therebetween such as an empty space.

The anisotropic conductive film 150 may include a resin film 151 and a plurality of conductive balls 155 dispersed in the resin film 151, as shown in FIG. 8B. The conductive balls 155 may have a structure in which metal particles such as nickel (Ni) and gold (Au) are coated on the surfaces of the polymer particles. The resin film 151 may include a thermosetting resin or a thermoplastic resin. In an exemplary embodiment, the resin film 151 of the anisotropic conductive film 150 may further include a material having an adhesive function.

The anisotropic conductive film 150 electrically connects the touch signal line 44 and the touch signal pad T_PAD1 overlapping each other in the thickness direction through the plurality of conductive balls 155 and also couples adjacent portions of touch signal pads T_PAD1 and touch lead signal line 44 to each other.

Referring to FIG. 9, the first touch signal pad T_PAD1 may be disposed on the touch lead signal line 44, as described above. The first touch signal pad T_PAD1 may be disposed over the plurality of portions of the touch lead signal line 44. The first touch signal pad T_PAD1 may overlap the first portion 45, the third portion 47 and the fifth portion 49 of the touch lead signal line 44 in the thickness direction. The end of the first touch signal pad T_PAD1 may overlap the fifth portion 49 of the touch lead signal line 44. In an exemplary embodiment, as shown in FIG. 9, the end of the first touch signal pad T_PAD1 is aligned with one end of the fifth portion 49 of the touch lead signal line 44, and with the boundary between the fifth portion 49 and the fourth portion 48.

FIGS. 10 to 14 are views showing a method of attaching a touch panel and a touch printed circuit board according to an exemplary embodiment of the disclosure.

Figure 10:
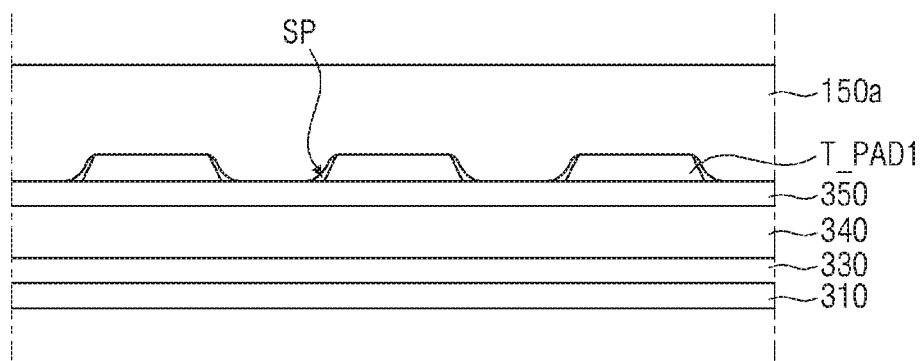
FIGS. 10 to 14 are views showing a method of attaching a touch panel and a touch printed circuit board according to an exemplary embodiment of the disclosure.

Referring to FIG. 10, an anisotropic conductive film material 150a is provided or formed on the second touch insulation layer 350 and the first touch signal pad T_PAD1. The anisotropic conductive film material 150a may include a resin film and a plurality of conductive balls dispersed in the resin film. The anisotropic conductive film material 150a may be in contact with the upper surface of the first touch signal pad T_PAD1 but may not be in contact with the side surfaces of the first touch signal pad T_PAD1 such that an empty space SP is formed or defined therebetween, as shown in FIG. 10.

Figure 11A:
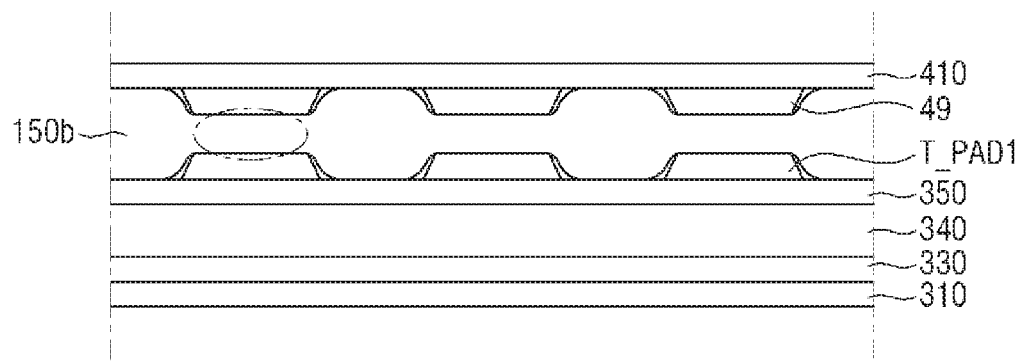
Figure 11B:
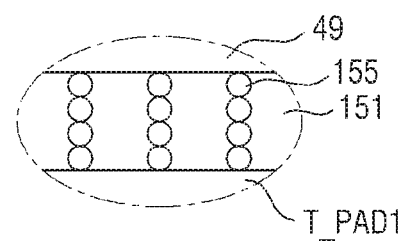

Referring to FIG. 11, a touch printed circuit board 40 is provided or disposed on the anisotropic conductive film material 150a. The base film 410 of the touch printed circuit board 40 and a plurality of portions of the touch lead signal line 44 may be in contact with an anisotropic conductive film material 150b. The anisotropic conductive film material 150b may be in contact with the lower surface of the first touch lead signal line 44 but may not be in contact with the side surfaces of the first touch portion 49 of the first touch lead signal line 44 such that an empty space SP is formed or defined therebetween, as shown in FIG. 11.

Figure 12A:
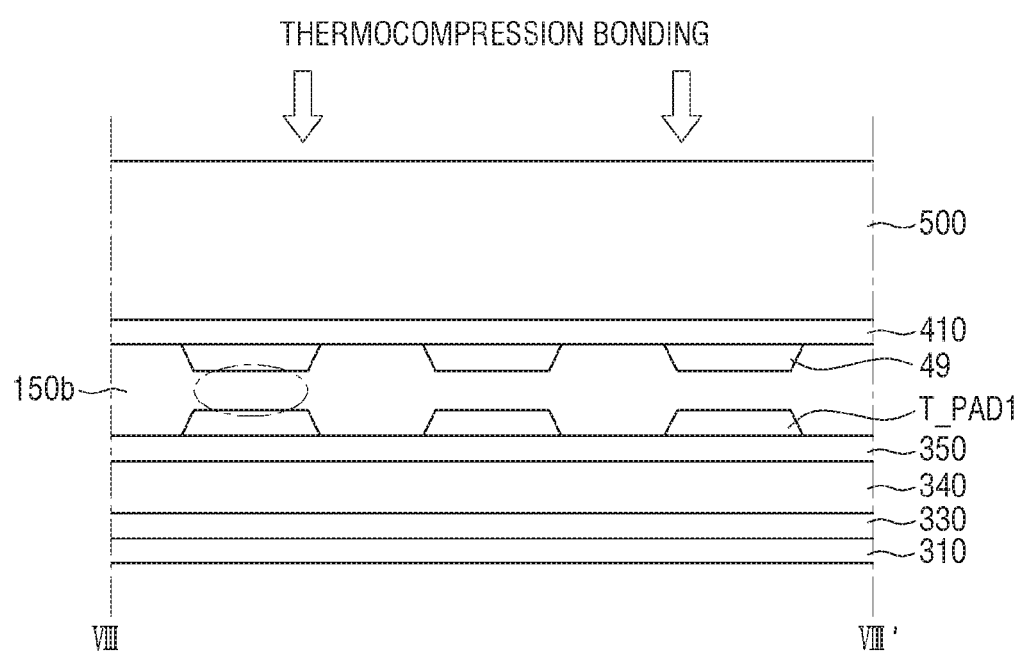
Figure 12B:
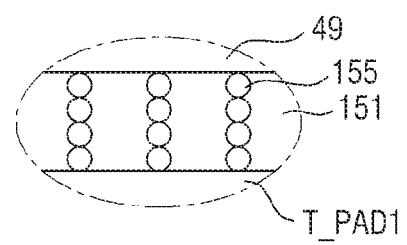

Referring to FIG. 12, a bonding apparatus 500 is placed above the touch printed circuit board 40. The bonding apparatus 500 may directly press down the upper surface of the touch printed circuit board 40 to couple the first touch lead signal line 44 with the touch signal pad T_PAD1 through the anisotropic conductive film material 150b. In an exemplary embodiment, the bonding apparatus 500 may supply heat to partially melt the anisotropic conductive film material 150b. Subsequently, the partially melted anisotropic conductive film material 150b may be subjected to the downward pressure so that the empty space between the side surface of the fifth portion 49 of the first touch lead signal line 44 and the anisotropic conductive film material 150b and the space between the side surface of the first touch signal pad T_PAD1 and the anisotropic conductive film material 150b may be filled with the anisotropic conductive film material 150b.

Figure 13:
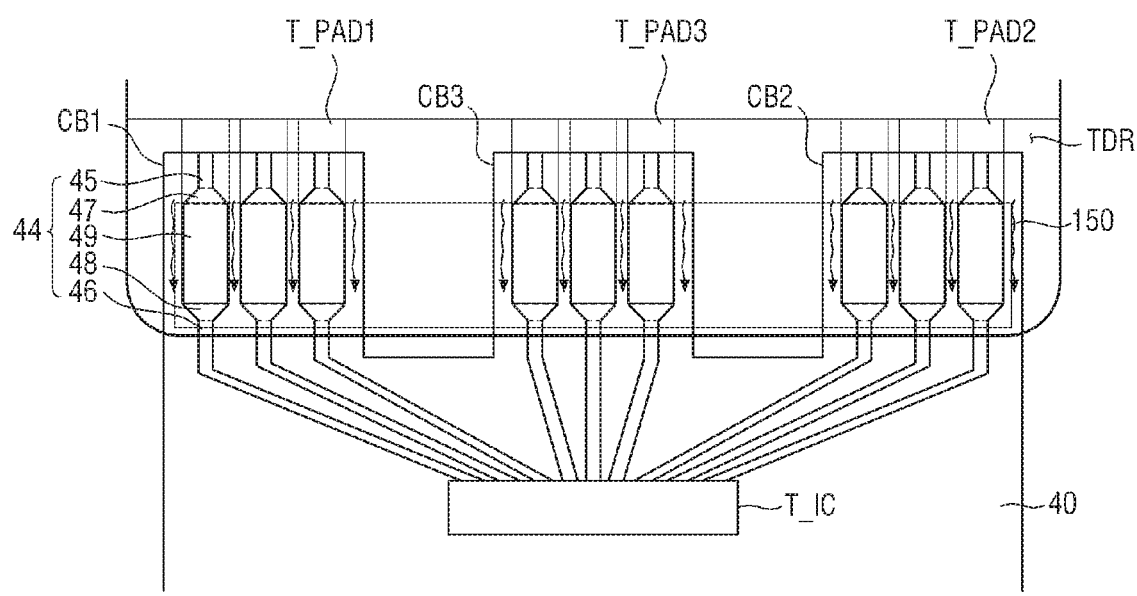
Figure 13:
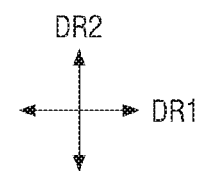
Figure 14:
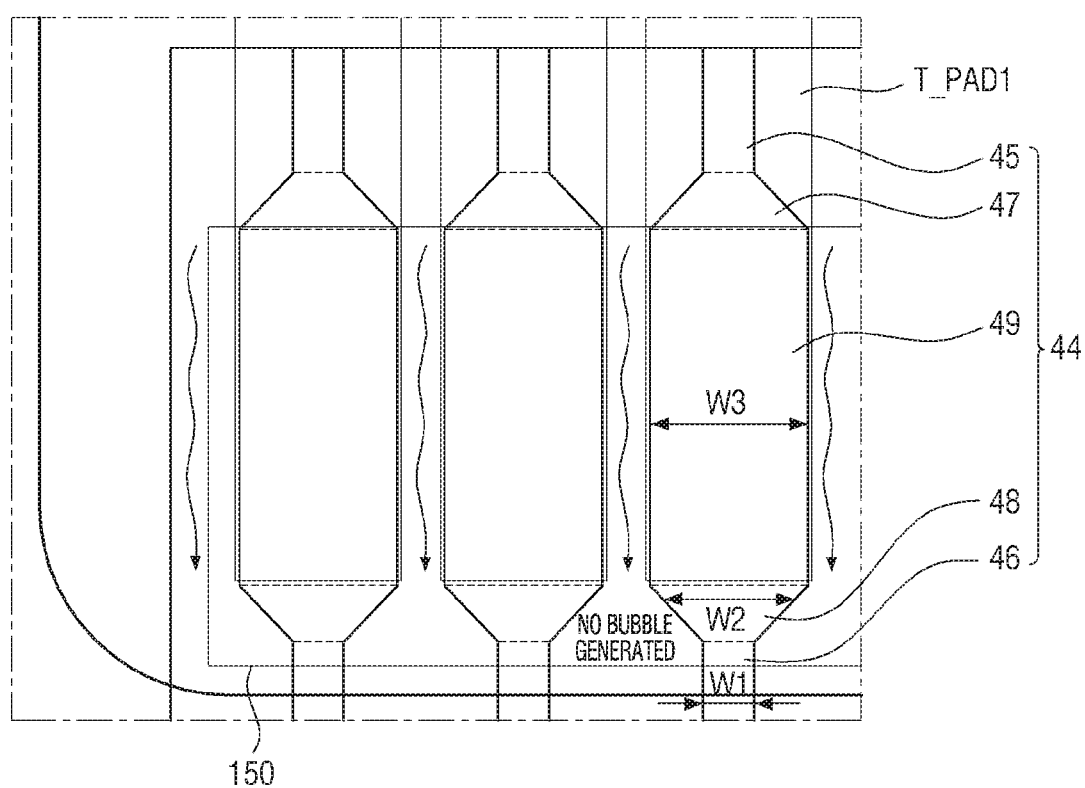

Referring to FIGS. 13 and 14, as described above, when the space SP is filled with the partially melted anisotropic conductive film material 150b by the downward pressure, the anisotropic conductive film material 150b flows as shown in FIGS. 13 and 14. In FIGS. 13 and 14, the anisotropic conductive film material 150b flows downwardly in the second direction DR2.

The area where the first touch signal pad T_PAD1 overlaps the touch lead signal line 44 is related to the coupling force between the first touch signal pad T_PAD1 and the touch lead signal line 44. As shown in FIGS. 13 and 14, the coupling area between the first touch signal pad T_PAD1 and the touch lead signal line 44 may be defined up to the end of the first touch signal pad T_PAD1. As the width of the touch lead signal line 44 is different in the portion where touch lead signal line 44 is coupled to the first touch signal pad T_PAD1, a vortex may occur at the portion, such that bubbles may be generated in the portion of the anisotropic conductive film where the width of the touch lead signal line 44 is varying. The bubbles of the anisotropic conductive film 150 may weaken coupling force between the touch lead signal line 44 and the first touch signal pad T_PAD1, thereby lowering the bonding reliability.

In an exemplary embodiment of the display device 1 according to the disclosure, the touch lead signal line 44 (e.g., the fifth portion 49) has a constant width at the portion where the touch lead signal line 44 is coupled to the touch signal pad T_PAD1, so that bubbles due to a vortex may be effectively suppressed, such that the bonding reliability is effectively prevented from being lowered.

Figure 15A:
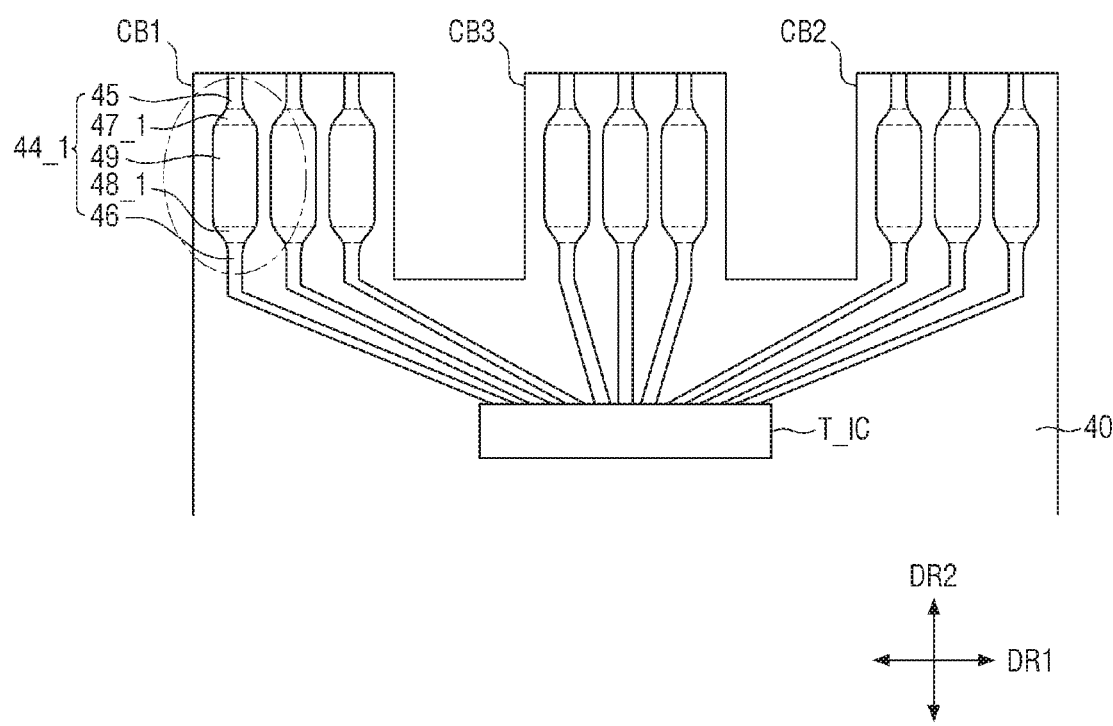
FIG. 15A is a plan view showing a layout of touch lead signal lines of a touch printed circuit board according to an alternative exemplary embodiment of the disclosure.
Figure 15B:
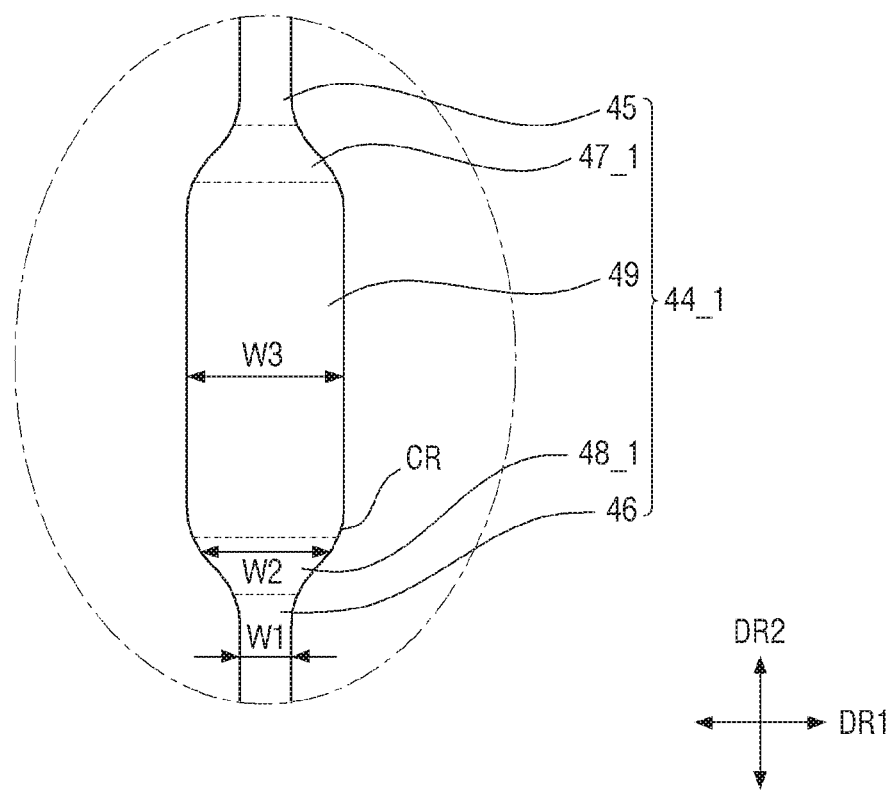
FIG. 15B is an enlarged view of the encircled portion of FIG. 15A.
Figure 16A:
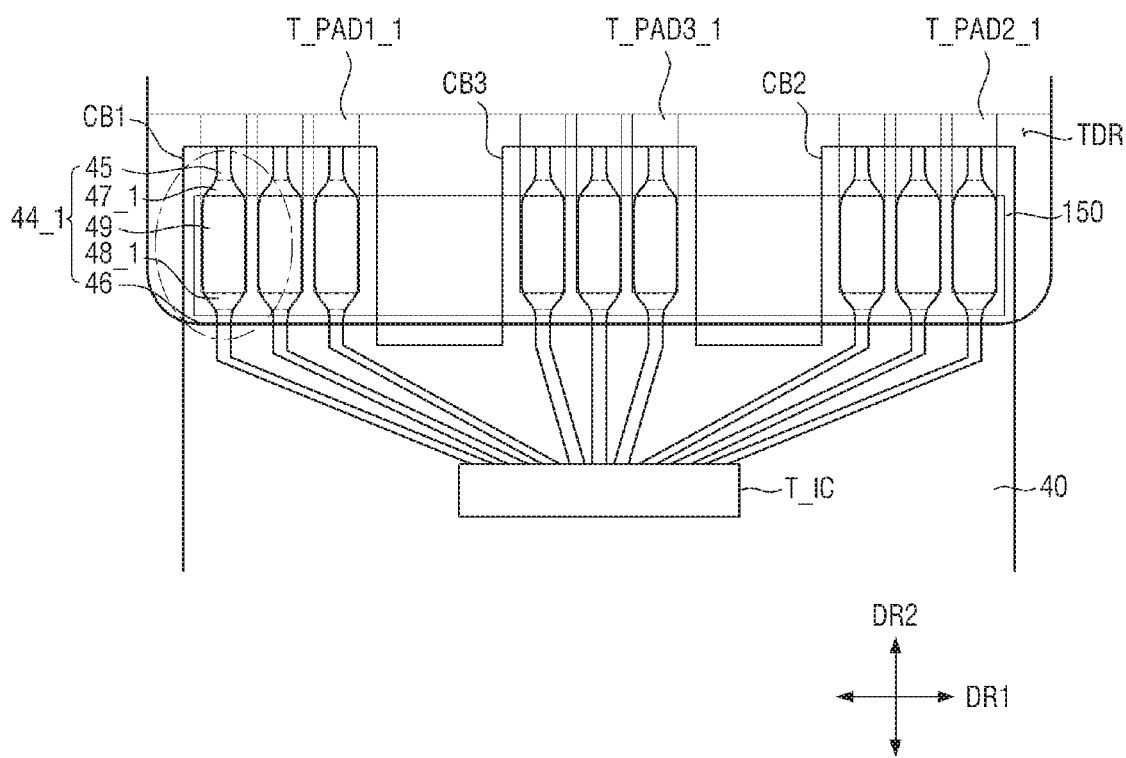
FIG. 16A is a plan view showing a touch panel and a touch printed circuit board attached together according to another alternative exemplary embodiment of the disclosure.
Figure 16B:
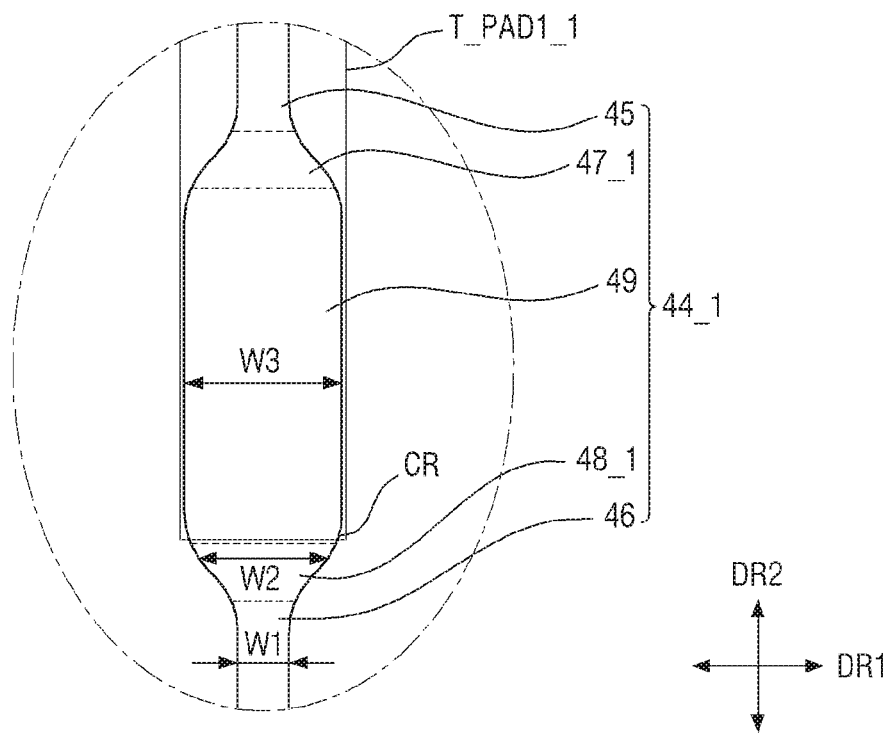
FIG. 16B is an enlarged view of the encircled portion of FIG. 16A.

FIG. 15A is a plan view showing a layout of touch lead signal lines of a touch printed circuit board according to an alternative exemplary embodiment of the disclosure. 15B is an enlarged view of the encircle portion of FIG. 15A. FIG. 16A is a plan view showing a touch panel and a touch printed circuit board attached together according to another alternative exemplary embodiment of the disclosure. FIG. 16B is an enlarged view of the encircle portion of FIG. 16A.

Figure 6A:
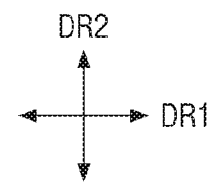

The exemplary embodiments shown in FIGS. 15A to 16B are substantially to the same or similar to the exemplary embodiment of FIG. 6 except that the side profile of a third portion 47_1 and a fourth portion 48_1 of a touch lead signal line 44_1.

In alternative exemplary embodiments, as shown in FIGS. 15A to 16B, the side profiles of the third portion 47_1 and the fourth portion 48_1 may include side profiles having two or more different slopes. In one exemplary embodiment, for example, the side surfaces of the fourth portion 48_1 may have a convex curved side profile CR. As shown in FIGS. 15A and 15B, the side profile CR in the curved shape having a single curvature.

As shown in FIGS. 16A and 16B, a first touch signal pad T_PAD1 may be disposed on the touch lead signal line 44_1. The first touch signal pad T_PAD1 may overlap a first portion 45, a third portion 47_1, a fifth portion 49 and a fourth portion 48_1 of the touch lead signal line 44 in the thickness direction. In such an embodiment, the end of the first touch signal pad T_PAD1 may be disposed on the fourth portion 48_1 of the touch lead signal line 44_1. In such an embodiment, the end of the first touch signal pad T_PAD1 may be disposed on the end of the third portion 47 of the touch lead signal line 44_1 and at the boundary between the fourth portion 48_1 and the second portion 46. In an exemplary embodiment, the end of the first touch signal pad T_PAD1 may be disposed on the third portion 49 of the touch lead signal line 44_1.

In an exemplary embodiment, as shown in FIGS. 16A and 16B, the first touch signal pad T_PAD1 may be disposed on a first portion 45, a third portion 47_1 and a fifth portion 49 of the touch lead signal line 44_1 and may not overlap the fourth portion 48_1.

In such an embodiment, even though the end of the first touch signal pad T_PAD1 is disposed on the end of the third portion 49 of the touch lead signal line 44_1 and at the boundary between the fourth portion 48_1 and the second portion 46, bubbles may be effectively prevented from being formed in the anisotropic conductive film 150 due to a vortex or the like as the side surfaces of the fourth portion 48_1 have the convex curved side profile CR.

Figure 17A:
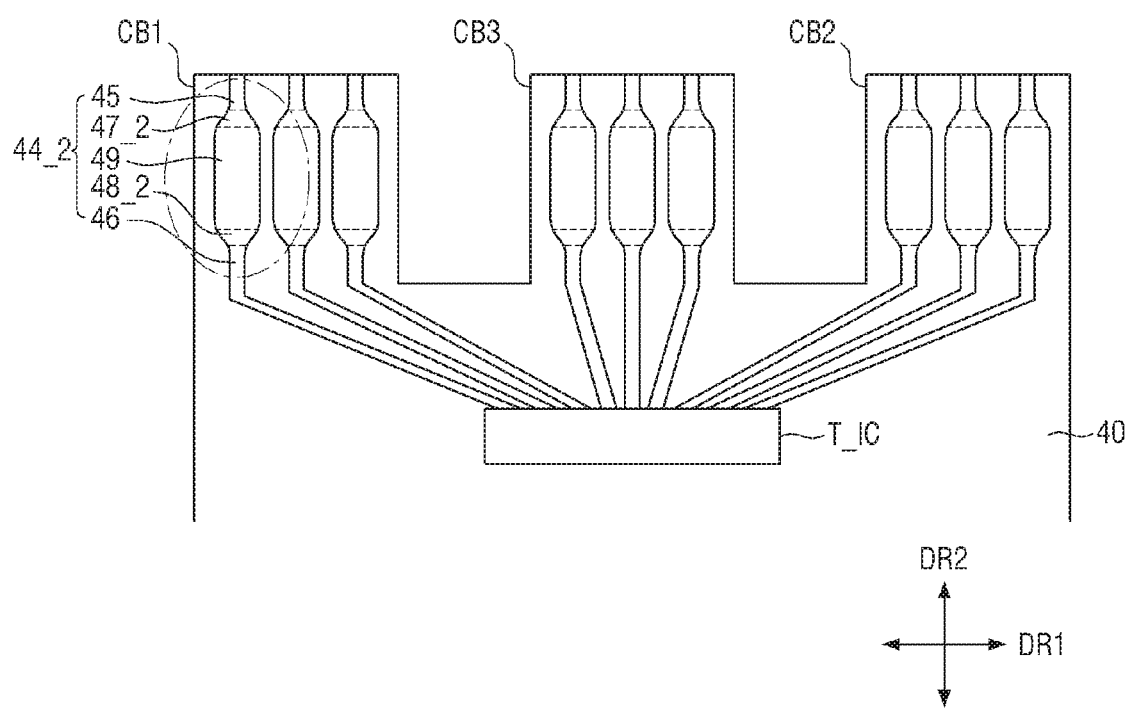
FIG. 17A is a plan view showing a layout of touch lead signal lines of a touch printed circuit board according to yet another alternative exemplary embodiment of the disclosure.
Figure 17B:
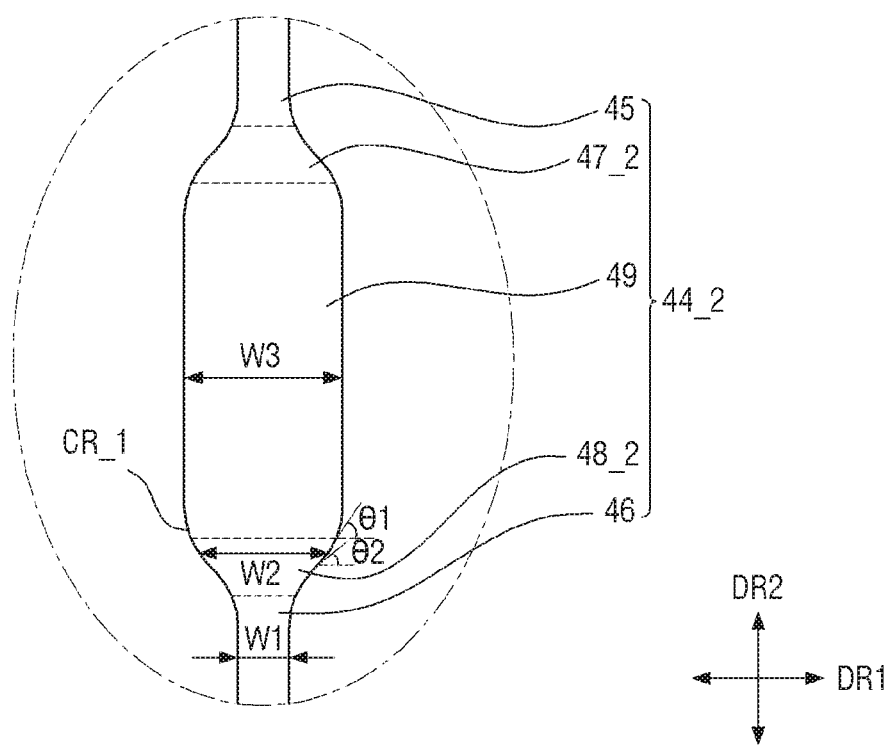
FIG. 17B is an enlarged view of the encircled portion of FIG. 17A.

FIG. 17A is a plan view showing a layout of touch lead signal lines of a touch printed circuit board according to yet another alternative exemplary embodiment of the disclosure. FIG. 17B is an enlarged view of the encircled portion of FIG. 17A.

The side profile of a fourth portion 48_2 (or the third portion 47_2) of the touch printed circuit board shown in FIG. 17 is different from the side profile of the touch printed circuit board shown in FIGS. 15 and 16.

In an exemplary embodiment, as shown in FIGS. 17A and 17B, the fourth portion 48_2 may have a convex curved side profile CR_1. As shown in FIG. 17B, the side profile CR_1 in the curved shape may be divided into two or more portions having different curvatures from each other. In one exemplary embodiment, for example, the side profile CR_1 in the curved shape may include a first portion having a first curvature and a second portion having a second curvature. The first portion may be connected to a fifth portion 49, and the second portion may be connected to a second portion 46. The first curvature may be greater than the second curvature. In such an embodiment, a first tangent slope θ1 at the first portion may be larger than a second tangent slope θ2 at the second portion. In such an embodiment, as the first portion that is less curved than the second portion of the side profile CR_1 in the curved shape is located closer to the fifth portion 49, bubbles may be effectively prevented from generating in the anisotropic conductive film 150 due to a vortex or the like, even though the end of the first touch signal pad T_PAD1 is disposed on the end of the third portion 49 of the touch lead signal line 44_2 and at the boundary between the fourth portion 48_2 and the second portion 46.

According to an exemplary embodiment, the fourth portion 48_2 may include only two portions having different tangent slopes as shown in FIGS. 17A and 17B, but the disclosure is not limited thereto. Alternatively, the fourth portion 48_2 may include three or more portions having different tangent slopes from each other. In such an embodiment, the tangent slope may be gradually reduced from the portion adjacent to the fifth portion 49 to the portion adjacent to the second portion 46.

Figure 18:
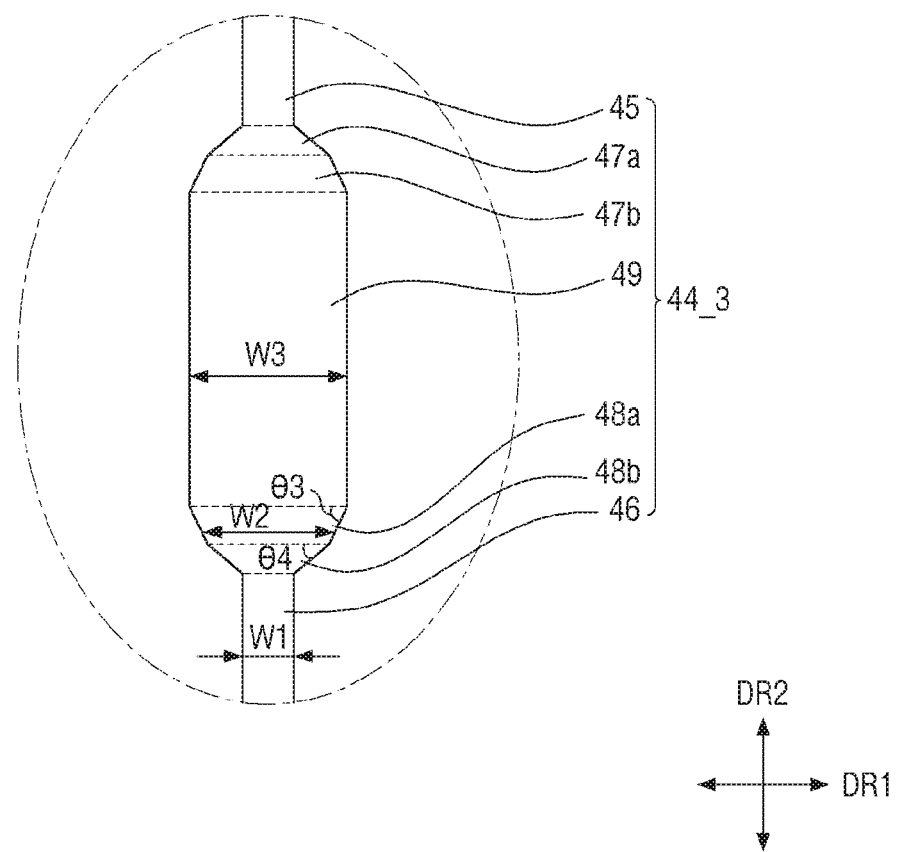
FIG. 18 is a plan view showing a layout of touch lead signal lines of a touch printed circuit board according to yet another alternative exemplary embodiment of the disclosure.

FIG. 18 is a plan view showing a layout of touch lead signal lines of a touch printed circuit board according to yet another alternative exemplary embodiment of the disclosure.

The touch printed circuit board shown in FIG. 18 is different from the touch printed circuit board 40 in that a third portion has a first portion 47*a* and a second portion 47*a* having different side profile slopes, and a fourth portion has a first portion 48*a* and a second portion 48*b* having different side profile slopes from each other.

In such an embodiment, as described above, the fourth portion may include a first portion 48*a* and a second portion 48*b* having different side profile slopes from each other. The side profile of each of the first portion 48*a* and the second portion 48*b* may be linear. The side profile of the first portion 48*a* may have a first tangent slope θ3, and the side profile of the second portion 48*b* may have a second tangent slope θ4. The first tangent slope θ3 may be greater than the second tangent angle θ4.

According to an exemplary embodiment, even though the end of the first touch signal pad T_PAD1 is disposed on the end of the third portion 49 of the touch lead signal line 44_3 and at the boundary between the fourth portion 48_2 and the second portion 46, bubbles may be effectively prevented from generating in the anisotropic conductive film 150 due to a vortex or the like as the first tangent slope θ3 of the (first portion 48*a* is greater than the second tangent angle θ4 of the second portion 48*b*.

According to an exemplary embodiment, the fourth portion may include only two sub-portions having different slopes as shown in FIG. 18, but the disclosure is not limited thereto. Alternatively, the fourth portion may include may include three or more sub-portions. In such an embodiment, the tangent slope may be gradually reduced from the sub-portion adjacent to the fifth portion 49 to the portion adjacent to the second portion 46.

The invention should not be construed as being limited to the embodiments set forth herein. Rather, these embodiments are provided so that this disclosure will be thorough and complete and will fully convey the concept of the invention to those skilled in the art.

While the invention has been particularly shown and described with reference to exemplary embodiments thereof, it will be understood by those of ordinary skill in the art that various changes in form and details may be made therein without departing from the spirit or scope of the invention as defined by the following claims.

What is claimed is:

1. A display device comprising:
    a touch panel including a touch area and a pad area disposed at a side of the touch area;
    a touch printed circuit board comprising a contact portion attached on a surface of the pad area of the touch panel;
    an anisotropic conductive film disposed between the contact portion of the touch printed circuit board and the pad area of the touch panel; and
    a display panel on which the touch panel is disposed,
    wherein the touch panel comprises a touch signal line disposed in the pad area,
    wherein the touch printed circuit board comprises a touch lead signal line disposed in the contact portion and connected to the touch signal line through the anisotropic conductive film,
    wherein the touch lead signal line comprises a first portion having a constant first width in a first direction, a second portion having a second width in the first direction smaller than the first width and a third portion disposed between the first portion and the second portion along a second direction intersecting the first direction and having a third width in the first direction,
    wherein the third width in the first direction is greater than the second width and less than the first width, and the third width is gradually decreasing as being away from the first portion toward the second portion,
    wherein the touch signal line overlaps the first portion, and a distal of the touch signal line in the second direction is disposed on the third portion, and
    wherein an edge of the third portion has a side profile having two or more different slopes from each other.

2. The display device of claim 1, wherein the edge of the third portion have a convex curved shape.

3. The display device of claim 2, wherein the convex curved shape of the edge of the third portion has a single curvature.

4. The display device of claim 2, wherein
    the convex curved shape of the edge of the third portion comprises a first portion connected to the first portion and having a first tangent slope, and a second portion connected to the second portion and having a second tangent slope,
    wherein the first tangent slope is greater than the second tangent slope.

5. The display device of claim 1, wherein
    the edge of the third portion comprises a first portion connected to the first portion and having a first slope, and a second portion connected to the second portion and having a second slope,
    wherein the first slope is larger than the second slope.

6. The display device of claim 1, wherein
    the touch signal line is provided in plural,
    the touch lead signal line is provided in plural, and
    the anisotropic conductive film is disposed between adjacent touch signal lines, which are spaced apart from each other, and between adjacent touch lead signal lines, which are spaced apart from each other.

7. The display device of claim 6, wherein
    the adjacent touch signal lines and the anisotropic conductive film are in direct contact with each other without any space therebetween, and
    the adjacent touch lead signal lines and the anisotropic conductive film are in direct contact with each other without any space therebetween.

8. The display device of claim 6, wherein
    the contact portion comprises a first contact portion and a second contact portion spaced apart from the first contact portion,
    the touch signal line comprises a first touch signal line disposed on an upper surface of the pad area of the touch panel and a second touch signal line disposed on a lower surface of the pad area of the touch panel, the first touch signal line is coupled to the first contact portion, and the second touch signal line is coupled to the second contact portion.

9. The display device of claim 8, further comprising:

a display printed circuit board attached to the display panel, wherein the touch printed circuit board is bent away from a display side of the display panel and electrically connected to the display printed circuit board.

10. The display device of claim 9, further comprising:

a main circuit board electrically connected to the display printed circuit board and the touch printed circuit board.

11. The display device of claim 6, wherein the touch printed circuit board further comprises a touch driving integrated circuit, wherein the second portion is directly connected to the touch driving integrated circuit.

12. The display device of claim 1, wherein the touch lead signal line further comprises a fourth portion having a fourth width in the first direction smaller than the first width and a fifth portion that is disposed between the first portion and the fifth portion along the second direction and has a fifth width in the first direction, the first portion is disposed between the fourth portion and the second portion along the second direction, the fifth width of in the first direction is greater than the fourth width and less than the first width, and the fifth width is gradually decreasing as being away from the first portion toward the fourth portion.

13. A display device comprising:

a touch panel including a touch area and a pad area disposed at a side of the touch area;

a touch printed circuit board comprising a contact portion attached on a surface of the pad area of the touch panel; and an anisotropic conductive film disposed between the contact portion of the touch printed circuit board and the pad area of the touch panel, wherein the touch panel comprises a touch signal line disposed in the pad area, wherein the touch printed circuit board comprises a touch lead signal line disposed in the contact portion and connected to the touch signal line through the anisotropic conductive film, the touch lead signal line comprises a first portion having a constant first width in a first direction, a second portion having a second width in the first direction smaller than the first width and a third portion disposed between the first portion and the second portion along a second direction intersecting the first direction and having a third width in the first direction, wherein the third width in the first direction is greater than the second width and less than the first width, and the third width is gradually decreasing as being away from the first portion toward the second position, wherein the touch signal line overlaps the first portion, and a distal end of the touch signal line in the second direction is aligned with a boundary between the third portion and the first portion, and wherein an edge of the third portion has a side profile having two or more different slopes.

14. The display device of claim 13, wherein the edge of the third portion has a convex curved shape.

15. The display device of claim 13, wherein the touch signal line is provided in plural, the touch lead signal line is provided in plural, and the anisotropic conductive film is disposed between adjacent touch signal lines, which are spaced apart from each other, and between adjacent touch lead signal lines, which are spaced apart from each other.

16. The display device of claim 15, wherein the adjacent touch signal lines and the anisotropic conductive film are in direct contact with each other without any space therebetween, and the adjacent touch lead signal lines and the anisotropic conductive film are in direct contact with each other without any space therebetween.

17. The display device of claim 15, wherein the contact portion comprises a first contact portion and a second contact portion spaced apart from the first contact portion, the touch signal line comprises a first touch signal line disposed on an upper surface of the pad area of the touch panel and a second touch signal line disposed on a lower surface of the pad area of the touch panel, the first touch signal line is coupled to the first contact portion, and the second touch signal line is coupled to the second contact portion.

18. The display device of claim 17, further comprising:

a display printed circuit board attached to the display panel, wherein the touch printed circuit board is bent away from a display side of the display panel and electrically connected to the display printed circuit board.

19. The display device of claim 18, further comprising:

a main circuit board electrically connected to the display printed circuit board and the touch printed circuit board.

20. The display device of claim 15, wherein the touch printed circuit board further comprises a touch driving integrated circuit, and the second portion is directly connected to the touch driving integrated circuit.

* * * * *